United States Patent [19]
Yano et al.

[11] Patent Number: 5,267,238
[45] Date of Patent: Nov. 30, 1993

[54] NETWORK INTERFACE UNITS AND COMMUNICATION SYSTEM USING NETWORK INTERFACE UNIT

[75] Inventors: Takashi Yano, Tokyo; Atsushi Shibata, Sagamihara; Osamu Adachi, Hiratsuka; Kazunori Hoshi, Yokohama; Toshiharu Murai, Kawasaki, all of Japan

[73] Assignee: Ricoh Company, Ltd., Tokyo, Japan

[21] Appl. No.: 799,319

[22] Filed: Nov. 27, 1991

Related U.S. Application Data

[63] Continuation-in-part of Ser. No. 631,274, Dec. 20, 1990, abandoned.

[30] Foreign Application Priority Data

Dec. 29, 1989 [JP] Japan .................. 1-343894
Sep. 21, 1990 [JP] Japan .................. 2-253046
Nov. 28, 1990 [JP] Japan .................. 2-326371

[51] Int. Cl.$^5$ .................................. H04J 3/24
[52] U.S. Cl. .................... 370/94.3; 370/85.5; 370/85.13; 370/85.14; 370/94.1
[58] Field of Search ............ 370/13, 14, 15, 60, 370/60.1, 85.1, 85.2, 85.3, 85.4, 85.5, 85.13, 85.14, 94.1, 94.3, 85.15, 5; 340/825.5, 825.51, 825.52, 825.05, 825.02

[56] References Cited

U.S. PATENT DOCUMENTS

| | | | |
|---|---|---|---|
| 4,516,272 | 5/1985 | Yano | 370/60 |
| 4,715,030 | 12/1987 | Koch et al. | 370/85.2 |
| 4,771,391 | 9/1988 | Blasbalg | 370/85.2 |
| 4,794,590 | 12/1988 | Yano | 370/60 |
| 4,815,070 | 3/1989 | Hoshi | 370/60 |
| 4,819,229 | 4/1989 | Pritty et al. | 370/85.5 |
| 4,839,887 | 6/1989 | Yano | 370/60 |
| 4,843,605 | 6/1989 | Hoshi | 370/60 |
| 4,858,228 | 8/1989 | Hoshi | 370/60 |
| 4,887,259 | 12/1989 | Morita | 370/60 |
| 5,079,764 | 1/1992 | Orita et al. | 370/85.14 |
| 5,117,419 | 5/1992 | Konishi et al. | 370/85.13 |

OTHER PUBLICATIONS

TMS380 Adapter Chipset User's Guide, Jul. 1986, pp. iii, 4-127, 4-128, & A-110, Texas Instruments.

Primary Examiner—Douglas W. Olms
Assistant Examiner—Alpus H. Hsu
Attorney, Agent, or Firm—Oblon, Spivak, McClelland, Maier & Neustadt

[57] ABSTRACT

A network interface unit couples a lattice communication network and at least one token ring network. The network interface unit includes a sequence controller which controls a token detector and a reception register so that message information received from the lattice communication network via a node apparatus connection port is looped back from the token ring network via a terminal connection port and output from the node apparatus connection port when an address detector detects that a destination address matches a stored source address, and absorbed when the address detector detects that the destination address does not match the stored source address. The network interface unit also includes a phantom signal part which outputs a detection signal via the terminal connection port when a phantom signal has been received, the phantom signal part including a set of resistors coupled to the terminal connection port, each of the resistors having a resistance that produces a detection signal having an appropriate level.

30 Claims, 23 Drawing Sheets

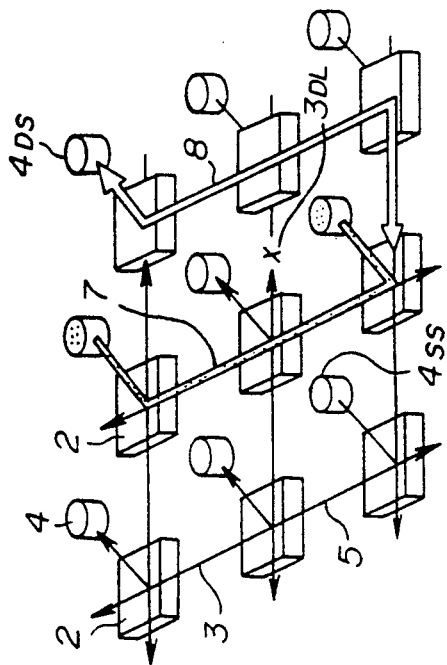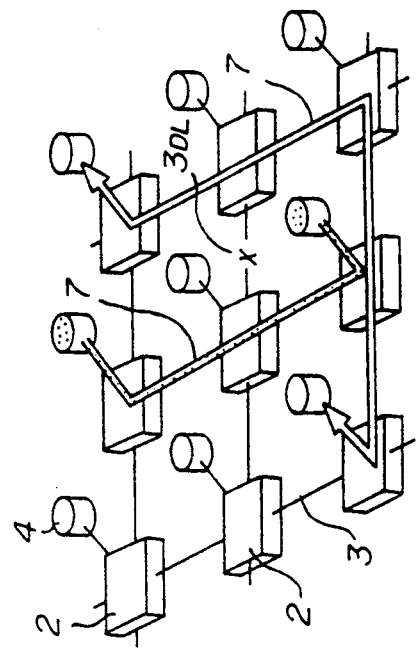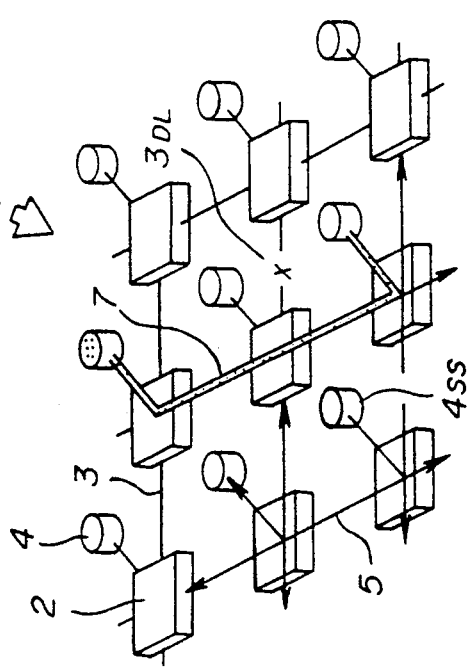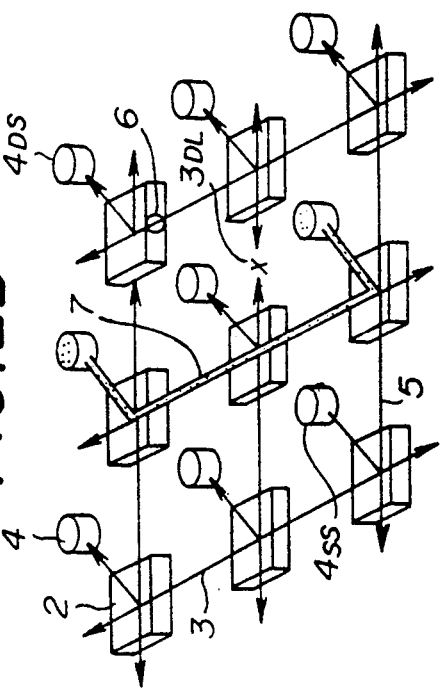

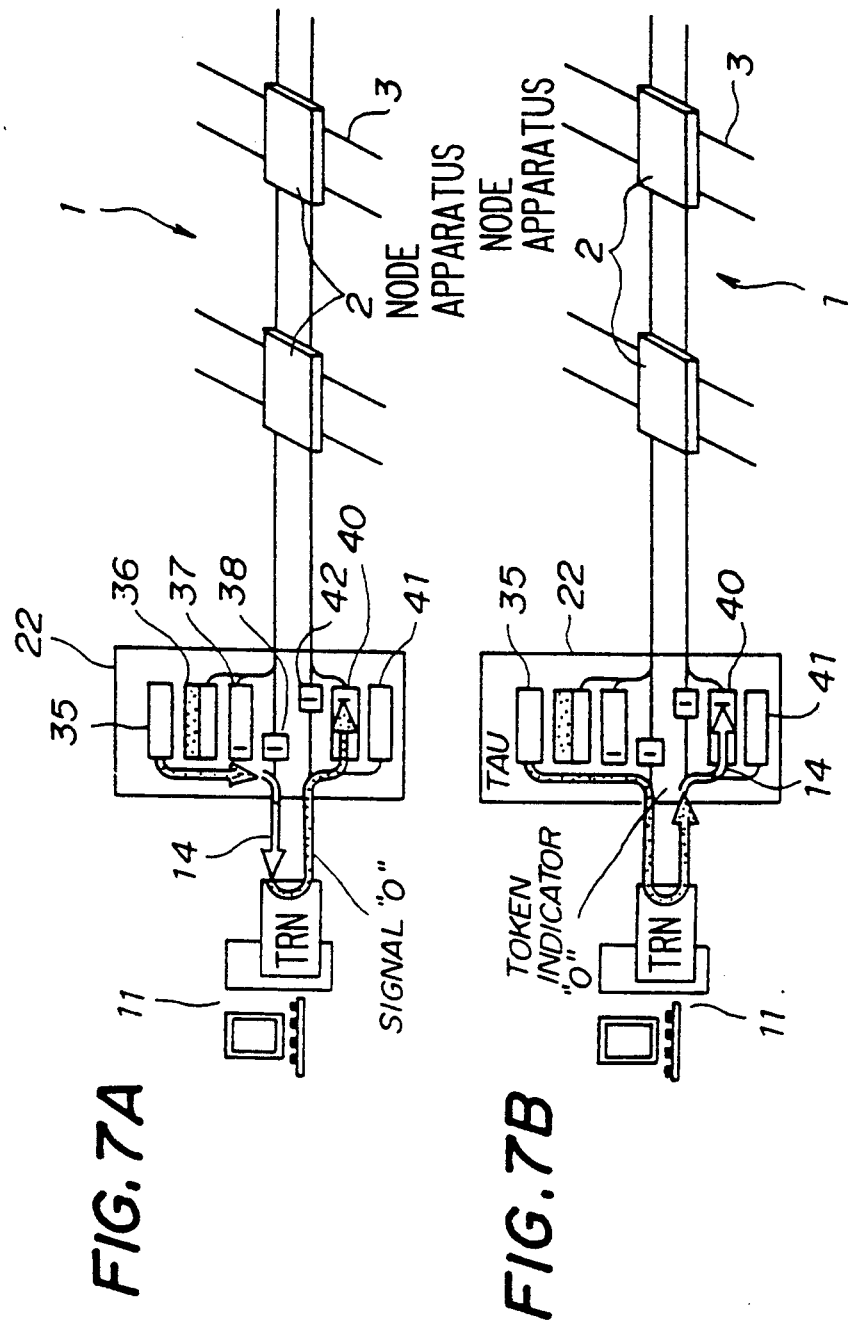

FIG.16A

TRANSMITTING FRAME

RETURNING FRAME

FIG.16B

TRANSMITTING FRAME

RETURNING FRAME (PARTIALLY DROPPED OUT)

TRANSMITTING FRAME

NO RETURNING FRAME $T_R$

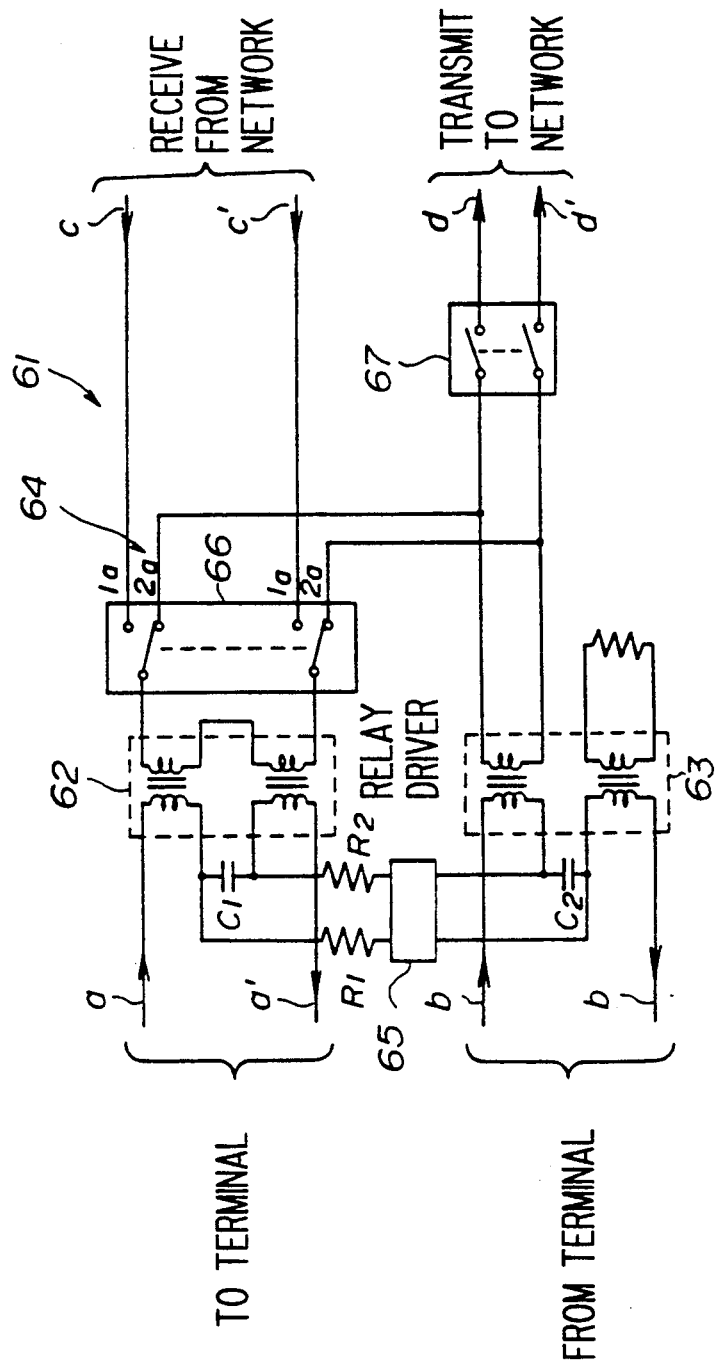

NETWORK INTERFACE UNITS AND COMMUNICATION SYSTEM USING NETWORK INTERFACE UNIT

This is a continuation-in-part application of Ser. No. 631,274 filed Dec. 20, 1990, now abandoned.

BACKGROUND OF THE INVENTION

The present invention generally relates to network interface units and communication systems, and more particularly to a network interface unit for connecting a token ring network to a communication network having a multi-conjunction architecture, and a communication network which uses such a network interface unit. Hence, the present invention is applicable to multimedia communication typified by a local area network (LAN).

A multi-channel lattice communication network which is applicable to LANs, public line networks and especially to a multi-media communication was previously proposed in U.S. Pat. No.4,839,887 in which the assignee is the same as the assignee of the present application. The proposed lattice communication network is analogous to nerve cells of a living body, and employs node apparatuses. Each node apparatus has a plurality of input and output channels and is used as a communication control element. Such node apparatuses are coupled in a multi-conjunction to form the lattice communication network. Each node apparatus transfers one of incoming digital signals according to a first-input-first-output logic.

The proposed lattice communication network has a large degree of freedom of network topology because of the multi-conjunction architecture. Thus, the survivability of data is high. In other words, even when a fault occurs in a path of the communication network, it is possible to carry out the communication through other paths. Furthermore, it is possible to select optimum paths for the communication because each node apparatus transfers the incoming digital signals according to the first-input-first-output logic.

On the other hand, the proposed lattice communication network employs a multi-channel system in which a plurality of connecting channels are established, so as to effectively achieve a full duplex communication. The proposed lattice communication network is effectively applicable to the physical layer to the network layer of the open system interconnection (OSI), for example.

As other networks, there is the token ring network employing the ring topology of IEEE 802.5. A description of the algorithm of this token ring network will be given later on in the specification. The token ring network has superior security functions in that all terminals are synchronized, only the terminal which has a free token (that is, a token which indicates the right to transmit) is authorized to make a transmission, message information is returned to a transmitting terminal thereby making it possible to confirm whether or not the message information is correctly received by a receiving terminal and the like. Moreover, the token ring network has a satisfactory throughput delay charactertistic when the traffic is high.

However, according to the token ring network, the transmitting terminal cannot start the transmission until the free token makes one round of the network, and the waiting time tends to become long. In addition, the performance of the token ring network deteriorates with system expansion. That is, in the token ring network, the time it takes for the free token to reach a terminal becomes longer as the number of terminals increases, and furthermore, the traffic becomes high at the same time, thereby making it even longer for the free token to reach a terminal. The token ring network also has a problem in that the survivability of data is poor because the network is greatly affected by a fault in a center ring.

On the other hand, the proposed lattice communication network does not have the concept of address, and can be regarded as "a cable which has a predetermined algorithm". In other words, the proposed lattice communication network does not require a fixed protocol, and it is thus possible to connect terminals which use various protocols. Accordingly, when a system is formed by connecting the terminals of the token ring network to the lattice communication network, it is possible to anticipate or expect that the problems of the token ring network will be eliminated and a token ring network which displays the advantageous features of the lattice communication network will be realized.

However, it is impossible to simply connect the terminals of the token ring network to the lattice communication network, as at least an interface unit is required to connect the token ring network and the lattice communication network. But as suce an interface unit has yet to be developed, there is a demand to realize such an interface unit.

In addition, a terminal of the token ring network generally outputs a phantom signal which produces a dc current on a lobe media or cable coupling the terminal to the token ring network, and a connecting condition between the terminal and the network via the cable is monitored according to the level of this dc current for a faulty condition, and after a normal connection is confirmed the terminal is connected to the network. Thus, it is necessary for a network interface unit, coupled to the token ring network, to output a level of such a current appropriate to the terminal, which current level must be within a predetermined range, so that a connecting condition between the terminal and the network is correctly monitored.

Moreover, prior to the output of a phantom signal, the terminal of the token ring network transmits a Lobe Media Test MAC frame (which is a kind of message information and hereinafter called a LMT frame) for detecting a condition of the cable (or lobe media) coupling the terminal and the network. If the cable is in a normal condition, the LMT frame transmitted by the terminal is immediately looped back from a concentrator of the token ring network. Thus, it is possible for the terminal to detect from the LMT frame which has been returned to the terminal that the lobe media is in a normal condition. Hence, in the case of the network interface unit for coupling the lattice communication network and the token ring network, there is a demand to provide means for looping a LMT frame back to the terminal when it has been received from the terminal, to achieve safe interface between the token ring network terminal and the lattice communication network.

SUMMARY OF THE INVENTION

Accordingly, it is a general object of the present invention to provide a novel and useful network interface unit and communication system, in which the problems described above are eliminated and the above described demands are satisfied.

Another and more specific object of the present invention is to provide a network interface unit for coupling a lattice communication network and at least one token ring network. The lattice communication network has a multi-conjunction architecture and comprises a plurality of node apparatuses, a plurality of first terminals, and a plurality of transmission paths each coupling one node apparatus to another node apparatus or a first terminal. Each node apparatus includes an input port comprising a plurality of input channels connected to the transmission paths, an output port comprising a plurality of output channels connected to the transmission paths, a switching gate part for coupling the input and output channels of the input and output ports, and control means for controlling the switching gate part to selectively couple one input channel which receives a digital signal first to all output channels other than an output channel having a channel number corresponding to a channel number of the one input channel according to a first-input-first-output logic. The token ring network comprises at least one second terminal which functions as one of transmitting and receiving second terminals, and a cable which is coupled to the second terminal and forms a ring, where a carrier signal and a free token are recirculated around the ring of the cable even in a standby state, the transmitting second terminal catches the free token and transmitting message information which is added to a busy token, the receiving second terminal copies the message information which is received and returns the message information which is added with a copy code, the transmitting second terminal enters the message information which is returned from the receiving second terminal and outputs a free token when an establishment of a communication is confirmed from the copy code. The network interface unit comprises a terminal connection port coupled to the second terminal of the token ring network via the cable, a node apparatus connection port coupled to the node apparatus of the lattice communication network, a free token generator, coupled to the terminal connection port and the node apparatus connection port, intermittently generating a carrier signal and a free token and outputting the generated carrier signal and free token to the terminal connection port when no carrier signal is received from the node apparatus connection port, a token detector, coupled to the terminal connection port, detecting whether a free token or message information is received from the terminal connection port, where the token detector absorbs the free token when the free token is detected and outputs the message information and a carrier signal to the node apparatus connection port when the message information is detected so as to broadcast the message information within the lattice communication network, an address detector, coupled to the terminal connection port and the node apparatus connection port, detecting from the message information received from the terminal connection port and storing a source address of the transmitting second terminal connected to the token ring network and detecting from the message information received from the node apparatus connection port whether or not a destination address matches the stored source address, reception register means, coupled to the node apparatus connection port and the terminal connection port, for stopping the free token generator from generating the free token when message information is received from the lattice communication network via the node apparatus connection port and for outputting the message information received from the lattice communication network to the terminal connection port, and a sequence controller coupled to and controlling the free token generator, the address detector and the reception register means. The sequence controller controls the token detector and the reception register means so that the message information received from the node apparatus connection port is looped back from the token ring network via the terminal connection port and output from the node apparatus connection port when the address detector detects that the destination address matches the stored source address, and the message information received from the node apparatus connection port is looped back from the token ring network via the terminal connection port and absorbed when the address detector detects that the destination address does not match the stored source address. According to the network interface unit of the present invention, it is possible to effectively bring out the advantageous features of both the lattice communication network and the token ring network by the connection achieved by the network interface unit.

Still another object of the present invention is to provide a communication system comprising a lattice communication network having a multi-conjunction architecture and comprising a plurality of node apparatuses, a plurality of first terminals, and a plurality of transmission paths each coupling one node apparatus to another node apparatus or a first terminal, where each node apparatus includes an input port comprising a plurality of input channels connected to the transmission paths, an output port comprising a plurality of output channels connected to the transmission paths, a switching gate part for coupling the input and output channels of the input and output ports, and control means for controlling the switching gate part to selectively couple one input channel which receives a digital signal first to all output channels other than an output channel having a channel number corresponding to a channel number of the one input channel according to a first-input-first-output logic, at least one token ring network comprising at least one second terminal which functions as one of transmitting and receiving second terminals, and a cable which is coupled to the second terminal and forms a ring, where a carrier signal and a free token are recirculated around the ring of the cable even in a standby state, the transmitting second terminal catches the free token and transmits message information which is added to a busy token, the receiving second terminal copies the message information which is received and returns the message information which is added with a copy code, the transmitting second terminal enters the message information which is returned from the receiving second terminal and outputs a free token when an establishment of a communication is confirmed from the copy code, and at least one network interface unit which couples the lattice communication network to one token ring network, where the network interface unit comprises a terminal connection port coupled to the second terminal of the token ring network via the cable, a node apparatus connection port coupled to the node apparatus of the lattice communication network, a free token generator, coupled to the terminal connection port and the node apparatus connection port, intermittently generating a carrier signal and a free token and outputting the generated carrier signal and free token to the terminal connection port when no carrier signal is received from the node apparatus connection port, a token detector, coupled to the terminal connection port, detecting whether a free token or message information is received from the terminal connection port, where the token detector absorbs the free token when the free token is detected and outputs the message information and a carrier signal to the node apparatus connection port when the message information is detected so as to broadcast the message information within the lattice communication network, an address detector, coupled to the terminal connection port and the node apparatus connection port, detecting from the message information received from the terminal connection port and storing a source address of the transmitting second terminal connected to the token ring network and detecting from the message information received from the node apparatus connection port whether or not a destination address matches the stored source address, reception register means, coupled to the node apparatus connection port and the terminal connection port, for stopping the free token generator from generating the free token when message information is received from the lattice communication network via the node apparatus connection port and for outputting the message information received from the lattice communication network to the terminal connection port, and a sequence controller coupled to and controlling the free token generator, the address detector and the reception register means, where the sequence controller controls the token detector and the reception register means so that the message information received from the node apparatus connection port is looped back from the token ring network via the terminal connection port and output from the node apparatus connection port when the address detector detects that the destination address matches the stored source address, and the message information received from the node apparatus connection port is looped back from the token ring network via the terminal connection port and absorbed when the address detector detects that the destination address does not match the stored source address. According to the communication system of the present invention, it is possible to bring out the advantageous features of both the lattice communication network and the token ring network.

Other objects and further features of the present invention will be apparent from the following detailed description when read in conjunction with the accompanying drawings.

BRIEF DESCRIPTION OF THE DRAWINGS

FIGS. 2A through 2D are diagrams for explaining basic algorithms of the lattice communication network shown in FIG. 1;

FIGS. 7A and 7B are diagrams for explaining generation and absorbing of a free token;

FIGS. 8A through 8C are diagrams for explaining transmission of message information and down loading of address;

FIGS. 16A through 16C show relationships of a transmitting frame and a returned frame for various cases;

FIG. 24 is a diagram showing a transmission path switching part which is provided within the network interface unit shown in FIG. 23.

DESCRIPTION OF THE PREFERRED EMBODIMENTS

A description will be given of a first embodiment of the present invention.

Lattice Communication Network

Figure 1:
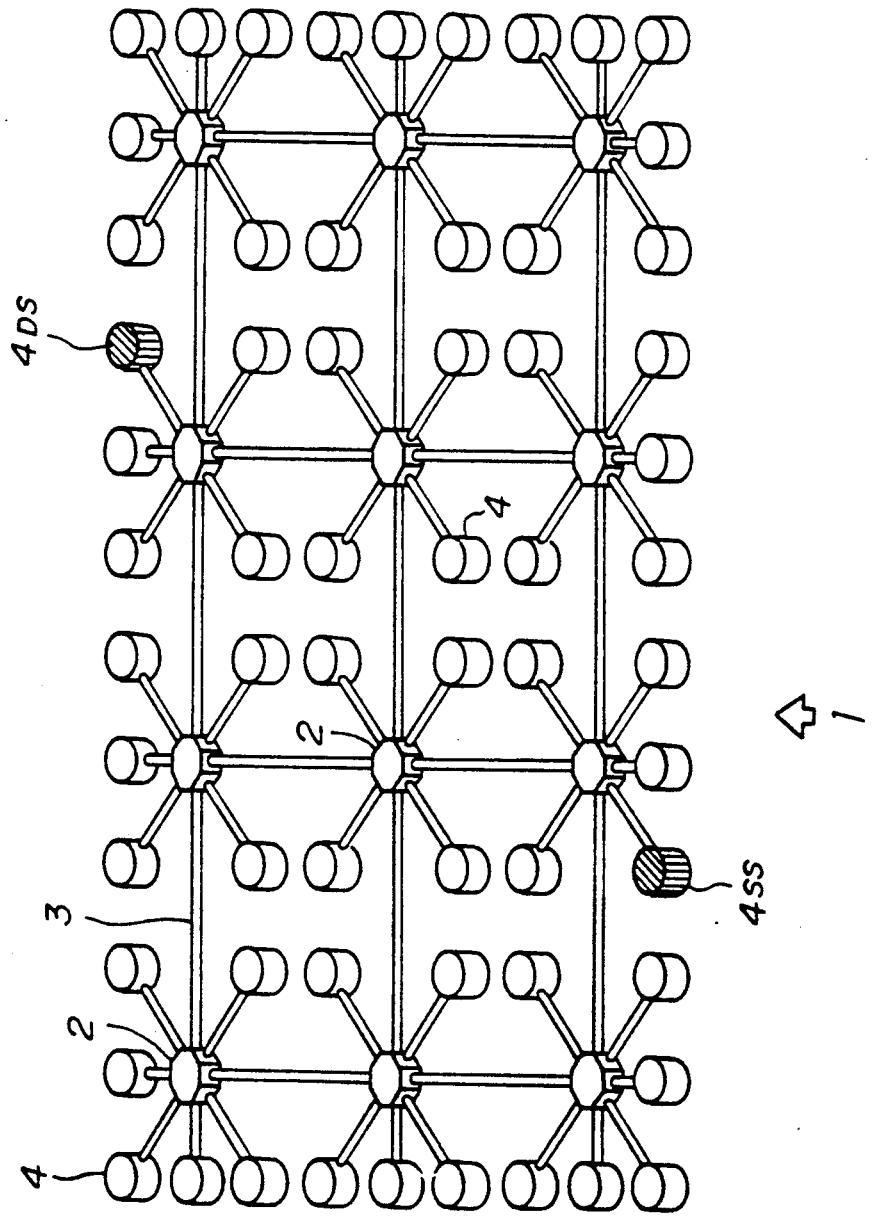
FIG. 1 is a system block diagram showing a lattice communication network having a multi-conjunction architecture.

First, a description will be given of a lattice communication network 1 shown in FIG. 1 which employs the multi-conjunction architecture. In FIG. 1, each node apparatus 2 is coupled to other node apparatuses 2 and/or terminals (stations) 4 via a transmission path (link) 3 in two or three dimensions to form a lattice communication network. The communication network 1 may be a linear communication network or a loop shaped communication network.

The node apparatus 2 is provided with a plurality of input/output ports, and the number of input/output ports is 8 in this embodiment. The input/output ports of the node apparatus 2 can be coupled to another node apparatus 2 or the terminal 4 via the transmission path 3. There is no limited to the number of input/output ports of the node apparatus 2, and the number is three or more, for example. The terminal 4 can transmit and receive data asynchronously. For example, the terminal 4 is a processing system such as a personal computer, a service station such as a filing station and a print station, and the like. It is desirable although not essential, that the data is transmitted in the form of message packets. Particularly in the case of the full duplex communication, it is desirable although not essential, that the terminal 4 is designed to transmit an acknowledge signal immediately after receipt of a packet which is intended for the terminal 4.

For example, the transmission path 3 is an optical transmission path formed by optic fibers or an electrical transmission path formed by twisted pair wire, coaxial cable and the like. In this embodiment, the data is transmitted in analog or digital form.

The node apparatus 2 has an input port which is connected to receiving lines of the transmission path 3 and an output port connected to transmitting lines of the transmission path 3. The input port is coupled to the output port via a switching gate part. The switching gate part selectively couples an arbitrary one of input channels of the input port to arbitrary ones of output channels of the output port. In addition, the input port is coupled to a start control part which detects whether or not an input signal is received by the input port and discriminates a first receiving input channel which receives the input signal first.

FIGS. 2A through 2D are diagrams for explaining the basic algorithms of the lattice communication network 1. The basic algorithms generally include functional algorithms which are a routing algorithm and a path fixing algorithm. These algorithms do not use the concept of address and are realized by merely detecting the existence of signals.

First, in the case of the routing algorithm for correctly transmitting message information to the receiving terminal, only one message information is selected and output out of the plurality of message information input to the plurality of input channels of the input port. The selected message information is output from all of the output channels of the output port excluding the output channel having a channel number corresponding to the channel number of the input channel which received the selected message information. Accordingly, the selected message is broadcast within the lattice communication network 1 without overlap by avoiding a faulty or dormant node apparatus and a faulty or dormant transmission path. As a result, the data survivability is improved. The first-input-first-output logic is used as the algorithm for selecting only one of the plurality of message information input to the input channels of the input port. Hence, only the message information which takes the shortest path reaches the receiving terminal.

FIGS. 2A and 2B show a case where message information 5 indicated by a bold arrow is transmitted from a transmitting terminal (source station $4_{SS}$ to a receiving terminal (destination station $4_{DS}$. In this case, a faulty or dormant transmission path $3_{DL}$ and a fixed path 7 are included in the lattice communication network 1. A channel 6 indicates the channel which receives the message information 5 first according to the first-input-first output logic.

Next, a path fixing algorithm is carried out to fix a specific path between the transmitting terminal $4_{SS}$ and the receiving terminal $4_{DS}$ by detecting the message information 5 and the acknowledge information 8 and to release the other transmission paths 3 for other communications. First, when a destination address of the message information 5 matches the address of the receiving terminal $4_{DS}$, the receiving terminal $4_{DS}$ outputs the acknowledge information 8 as shown in FIG. 2C. In this state, when the node apparatus 2 receives the acknowledge information 8 at the input channel having a channel number corresponding to the channel number of the output channel from which the message information 5 is output, these input and output channels are coupled while the other channels are released. Since all of the node apparatuses 2 carry out such a channel connecting operation, the acknowledge information 8 traces the path taken by the message information 5 and reaches the transmitting terminal $4_{SS}$. Hence, a new path is fixed as shown in FIG. 2D, and other parts of the lattice communication network 1 are used for the next communication.

A link time constant is used to distinguish the acknowledge information 8 from the same message information 5 received through other paths and other message information which made a collision. In addition, the communication ends when the input signal is no longer received at the pair of channels which is included in the fixed path, and the fixed path is then released.

The details of the lattice communication network 1 is further disclosed in the U.S. Pat. No. 4,839,887, U.S. Pat. No. 4,858,228, U.S. Pat. No. 4,815,070, U.S. Pat. No. 4,843,605 and U.S. Pat. No. 4,887,259, the disclosures of which are hereby incorporated by reference.

Token Ring Network

A description will be given of the algorithm of a token ring network by referring to FIGS. 3A through 3D. As shown in FIGS. 3A through 3D, a plurality of token ring network (TRN) terminals (stations) 11 are coupled in a loop through a concentrator 12 and a cable 13. The token ring network operates under the basic conditions that all the TRN terminals 11 are synchronized, only the TRN terminal 11 which obtains a free token can make a transmission and the message information is returned to a transmitting TRN terminal $11_{SS}$ and confirmed.

Figure 3A:
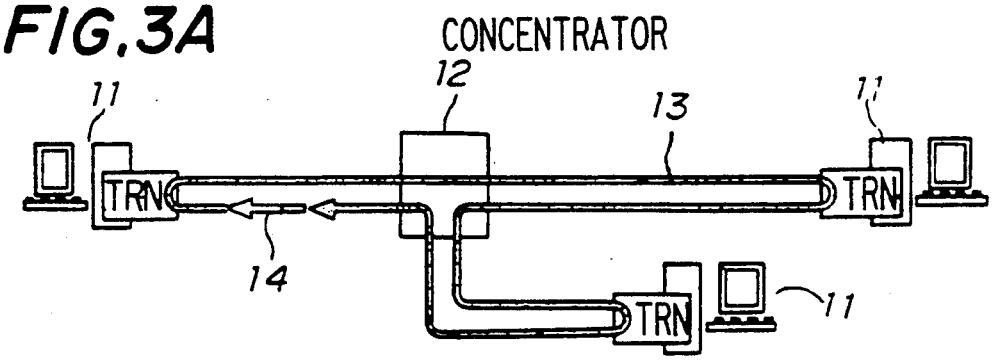
FIGS. 3A through 3D are system block diagrams for explaining basic algorithms of a token ring network.

First, as shown in FIG. 3A, a carrier signal exists on the cable 13 even in a standby state. This carrier signal is "0" in differential Manchester coding and will hereinafter be referred to as a signal "0". In addition, even in the standby state, a free token 14 having a token indicator "0" is recirculated on the cable 13.

Figure 3B:
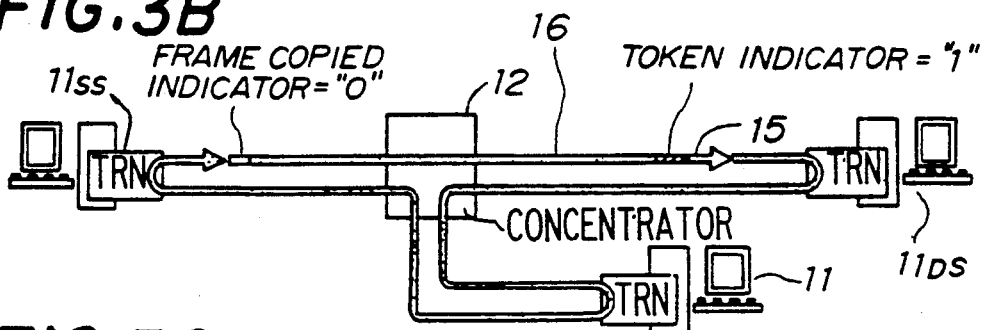

Next, as shown in FIG. 3B, a transmitting TRN terminal $11_{SS}$ catches the free token 14 and replaces the token by a busy token 15 having a token indicator "1". The transmitting TRN terminal $11_{SS}$ transmits the busy token 15 by adding a message frame 16. A frame copied indicator "0" is added to an end part of the message frame 16.

Figure 3C:
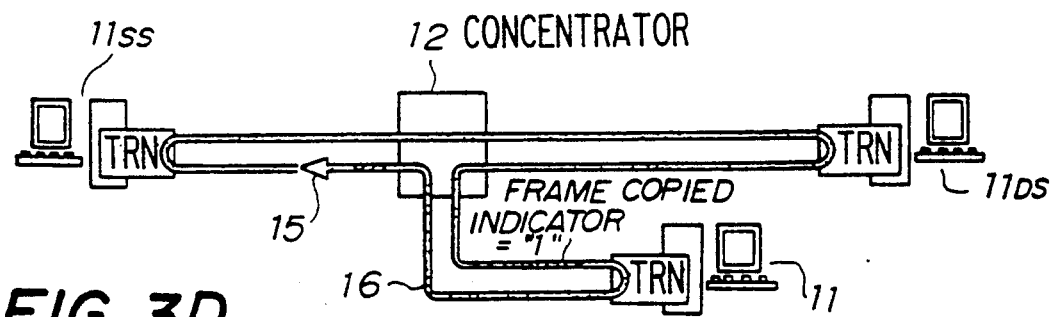

Then, as shown in FIG. 3C, a receiving TRN terminal $11_{DS}$ receives the message and copies the received message. The receiving TRN terminal $11_{DS}$ transfers the received message by adding a copy bit, that is, by adding a frame copied indicator "1". Those TRN terminals 11 other than the receiving TRN terminal $11_{DS}$ transfer the message as it is.

Figure 3D:
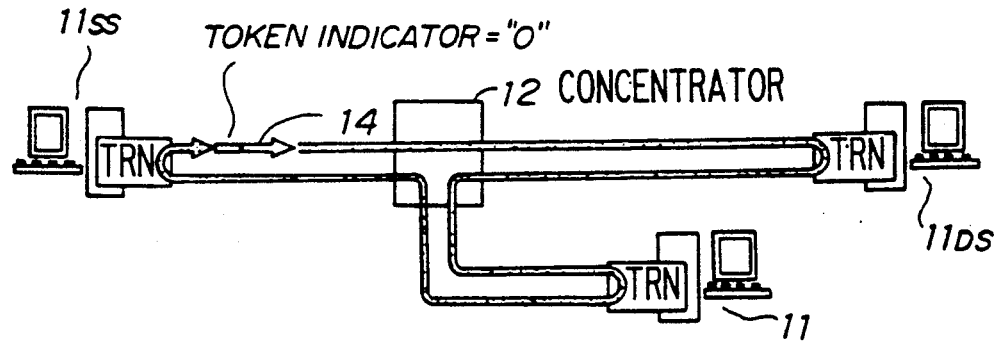

Next, when the transmitting TRN terminal $11_{SS}$ receives the transferred message, the transmitting TRN terminal $11_{SS}$ enters the transferred message and confirms establishment of the communication based on the copy bit, that is, from the frame copied indicator "1". Hence, as shown in FIG. 3D, the transmitting TRN terminal $11_{SS}$ outputs the free token 14 having the token indicator "0".

The token ring network uses the ring topology. However, a supervisor TRN terminal exists in the token ring network. This supervisor TRN terminal generates a token when the token disappears, and absorbs tokens when a plurality of tokens exist. In addition, a substitute TRN terminal acts as the supervisor TRN terminal when the supervisor TRN terminal breaks down. Thus, a high security function is ensured according to the token ring network.

Structure of Network Interface Unit

Figure 4:
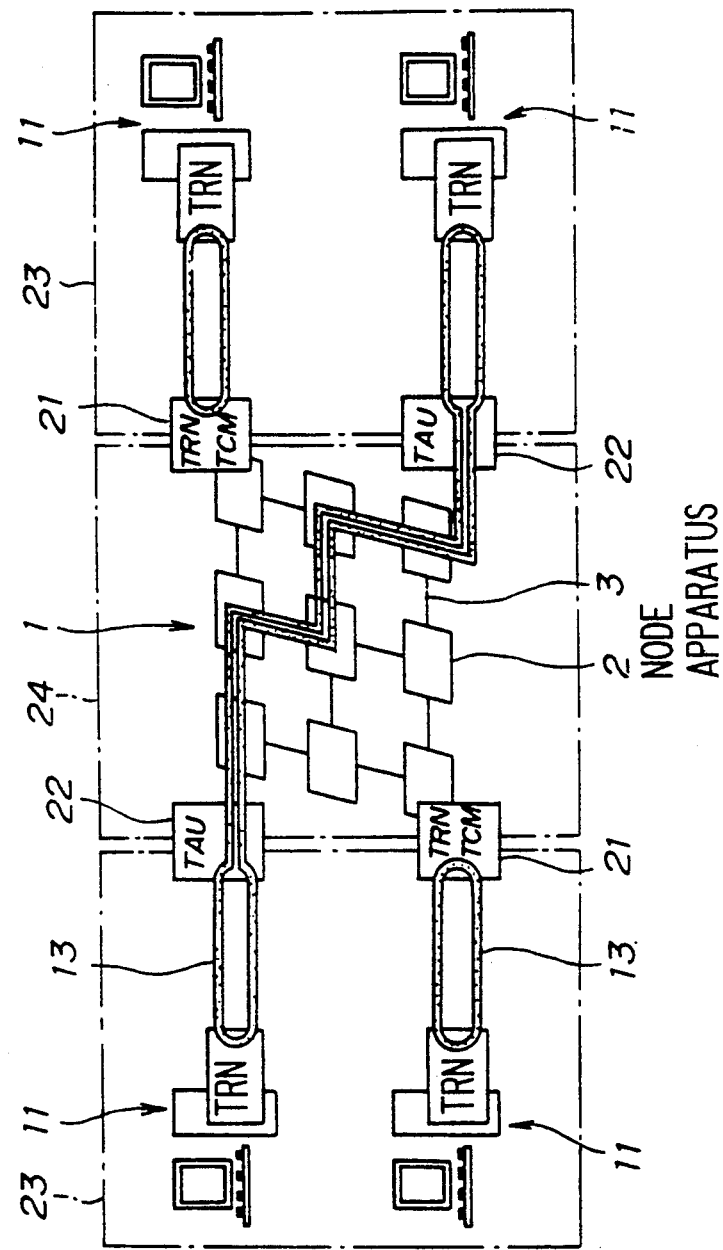
FIG. 4 is a system block diagram showing network interface units which connect the lattice communication network to token ring networks in a first embodiment of the invention.

When connecting the TRN terminal 11 of the token ring network to the lattice communication network 1 via a network interface unit according to the present invention, the network interface unit may take the form of a TRN terminal connect module (TCM) 21 or a TRN adaptive unit (TAU) 22 shown in FIG. 4.

A description will be given of the differences between the TRN TCM 21 and the TAU 22.

A terminal connecting port and a node apparatus connecting port of the TAU 22 respectively have one channel. The node apparatus connecting port is formed by a connector of an optical cable, an RS422 cable and the like.

The TRN TCM 21 corresponds to a bundle of a plurality of channels of the TAU 22. The node apparatus connecting port is inserted into a slot of the node apparatus 2 with the TTL level. In other words, the TRN TCM 21 forms a part of the node apparatus 2. Due to the characteristics of the lattice communication network 1, only one input signal which is received first is selected and the communication is generated thereby. Hence, when the plurality of channels form a bundle, it is possible to reduce the scale of the hardware.

In any case, the TRN terminal 11 is coupled to the node apparatus 2 of the lattice communication network 1 via the TRN TCM 21 or the TAU 22. Hence, a token ring network domain is formed between the TRN terminal 11 and the TRN TCM 21 or the TAU 22. In FIG. 4, token ring network regions 23 and a lattice communication network region 24 are respectively indicated by one-dot chain lines.

Figure 5B:
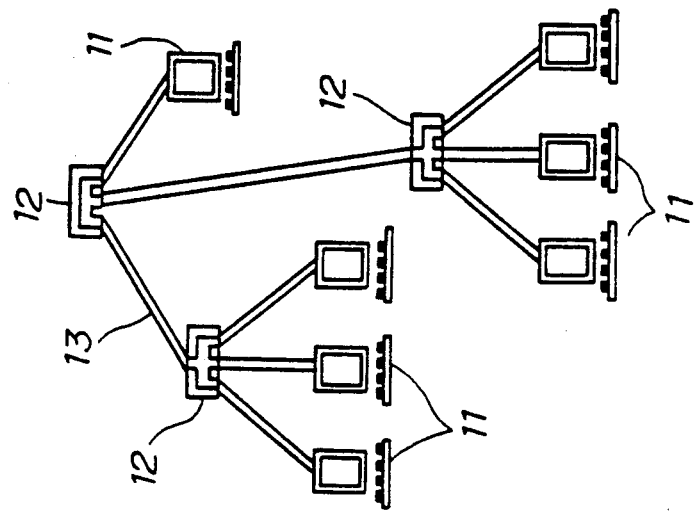
FIGS. 5A and 5B are diagrams for explaining connection of the token ring network and the lattice communication network in the first embodiment.
Figure 5A:
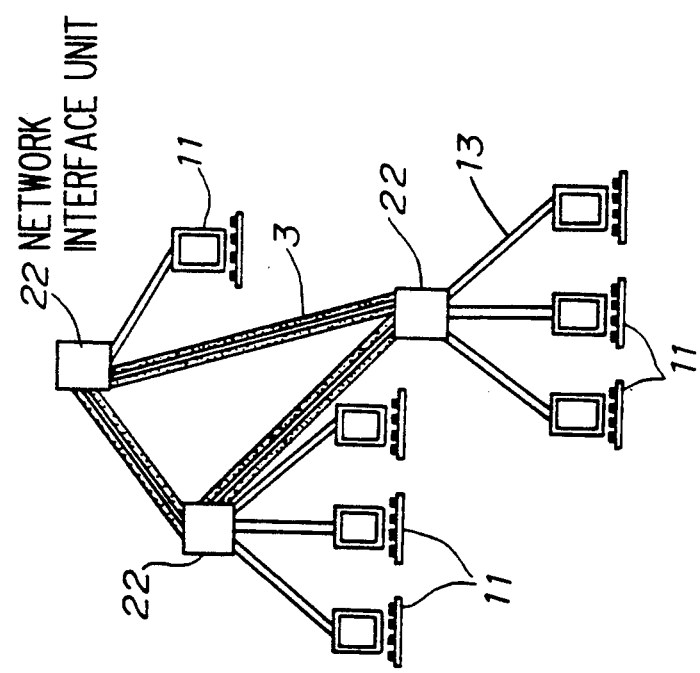

For example, when the concentrators 12 of the token ring network shown in FIG. 5B, is replaced by the node apparatus 2 of the lattice communication network 1 shown in FIG. 5A and having the network interface unit 22, it is possible to realize a communication system which includes the token ring network and the lattice communication network 1. In this case, the cable 13 between the TRN terminal 11 and the concentrator 12 is used as it is, and the cable (transmission path) 3 is newly provided between node apparatuses 2 for the lattice communication network 1.

The functions and operations of the TRN TCM 21 and the TAU 22 are exactly the same. For this reason, a description will be given of the TAU 22 for the sake of convenience.

Figure 6:
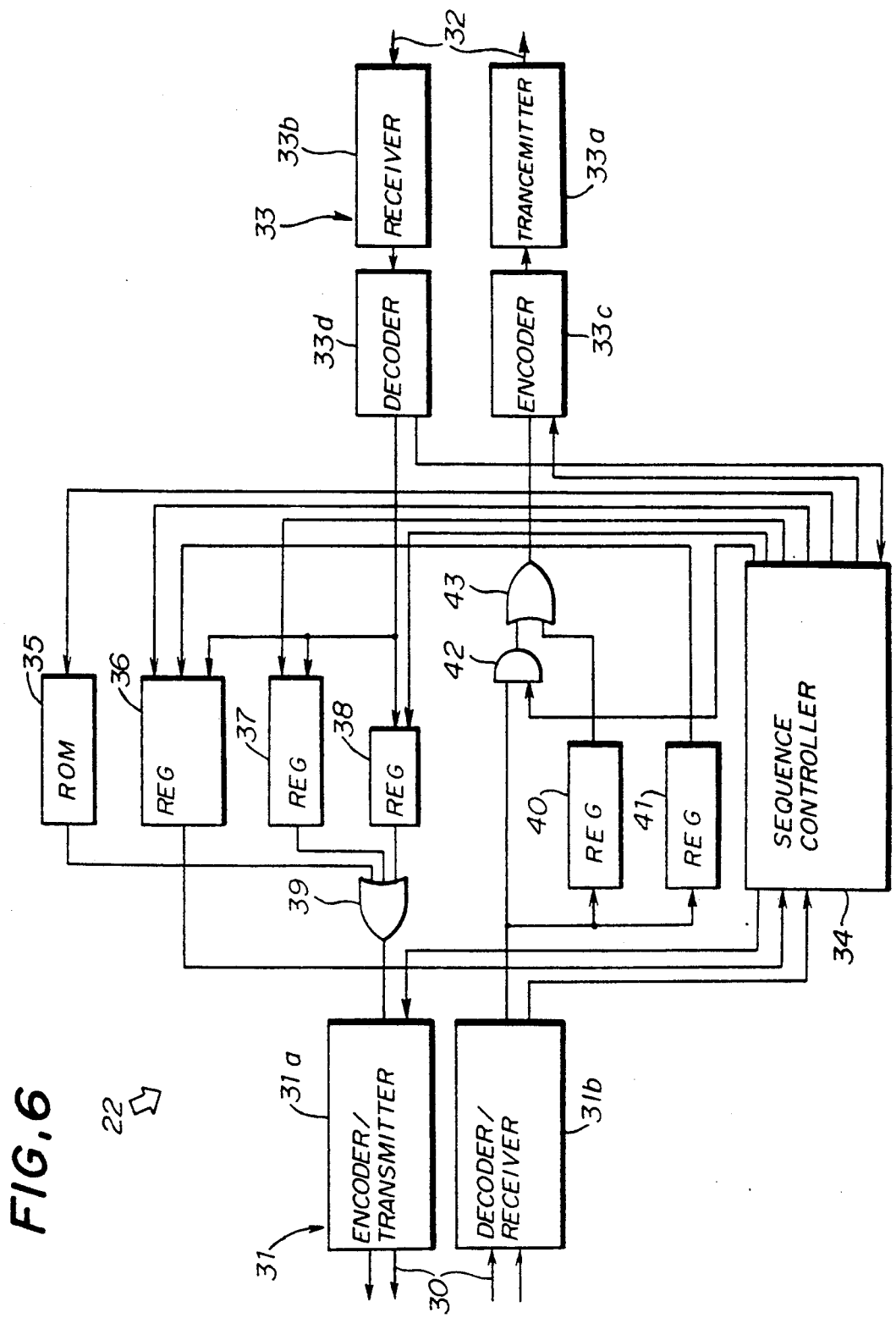
FIG. 6 is a system block diagram showing an embodiment of a TAU.

FIG. 6 shows an embodiment of the TAU 22. The TAU 22 is provided with a terminal connection port 31 which is coupled to the TRN terminal 11 via a TRN cable 30 which is an RS422 cable. The terminal connection port 31 includes a differential Manchester coding encoder/transmitter 31a and a differential Manchester decoder/receiver 31b. The TAU 22 is also provided with a node apparatus connection port 33 which is coupled to the node apparatus 2 of the lattice communication network 1 via an optical fiber cable 32. The node apparatus connection port 33 includes an optical data link transmitter 33a, an optical data link receiver 33b, a differential Manchester coding encoder 33c and a differential Manchester decoder 33d.

A sequence controller 34 of the TAU 22 starts control of the transmission sequence or the reception sequence when the differential Manchester coding decoder/receiver 31b or the differential Manchester coding decoder 33d detects the input message.

In the TAU 22, a free token generator 35 outputs a carrier signal and a free token, where the carrier signal is a signal "0" in Manchester code. In this embodiment, the free token generator 35 uses a read only memory (ROM). An address comparing register 36 functions as an address detector and compares an address which is stored with respect to the connected TRN terminal 11 and a destination address of a received message which is transferred from the node apparatus 2 in the reception state. In addition, a reception register 37 delays the received message by a predetermined time in the reception state and outputs the delayed received message to the connected TRN terminal 11. A reception first-in-first-out (FIFO) gate 38 is provided in parallel to the reception register 37. The reception FIFO gate 38 outputs to the connected TRN terminal 11 the message information which loops back from the receiving TRN terminal 11 in the transmission state in synchronism with the carrier signal. Accordingly, the free token generator 35, the reception register 37 and the reception FIFO gate 38 are coupled to the differential Manchester encoder transmitter 31a via an OR gate 39.

In addition, the TAU 22 includes a transmission register 40 and a down load register 41. The transmission register 40 functions as a token detector. In other words, the transmission register 40 reads the token indicator of the input signal from the connected TRN terminal 11 to distinguish the free token and the transmitting message. An output of the transmission register 40 is supplied to an OR gate 43 together with an output of a transmission through gate 42 which is coupled to the differential Manchester decoder receiver 31b. The down load register 41 reads the address of the connected TRN terminal 11 in the transmission state and down loads the read address to the address comparing register 36.

Basic Operation

The basic operation of the TAU 22 will be described in four parts, that is, the generation and absorbing of free token, transmission of message information and down loading of address, reception of message information, and transfer of message information.

Generation and Absorbing of Free Token

The free token 14 is transmitted and received only between the TRN terminal 11 and the TAU 22. First, in the standby state where no carrier signal exists in the lattice communication network 1, the TAU 22 intermittently outputs the signal "0" in Manchester code and the free token 14 generated from the free token generator 35 to the TRN terminal 11 as shown in FIG. 7A. In addition, the TAU 22 discriminates the free token 14 output from the TRN terminal 11 based on the token indicator "0" and absorbs the free token 14 as shown in FIG. 7B.

Transmission of Message Information and Down Loading of Address

Figure 8A:
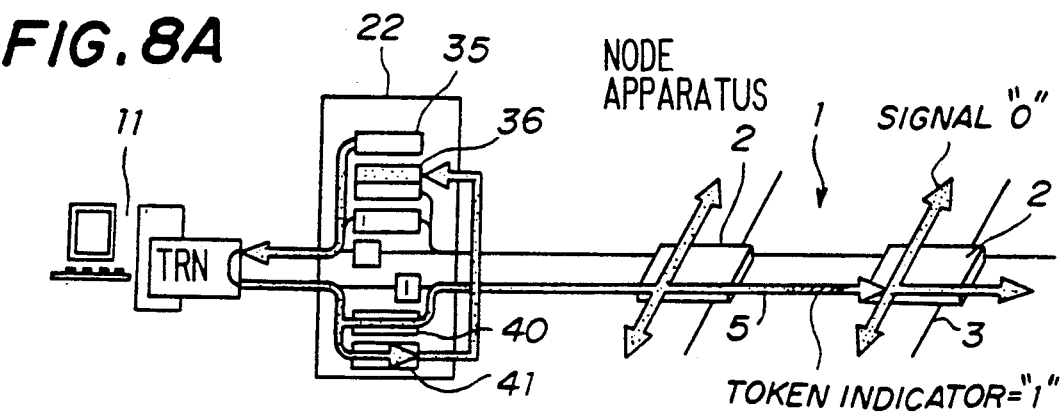

The TAU 22 outputs the message information output from the transmitting TRN terminal $11_{SS}$ to the lattice communication network 1. First, as shown in FIG. 8A, the TAU 22 distinguishes the message information 5 and the free token 14 output from the transmitting TRN terminal 11 in the transmission register 40 based on the token indicator "1" and regards only the message information 5 as the preamble. The TAU 22 adds a signal "0" to the preamble and outputs the preamble and the added signal to the lattice communication network 1 so as to stop the transmitting TRN terminal $11_{SS}$ from outputting the free token 14. The TAU 22 reads the address of the transmitting source by the down load register 41 and stores the read address in the address comparing register 36. Hence, the message information 5 which is output to the lattice communication network 1 is broadcast within the lattice communication network 1 due to the operation of the lattice communication network 1 described above.

Figure 8B:
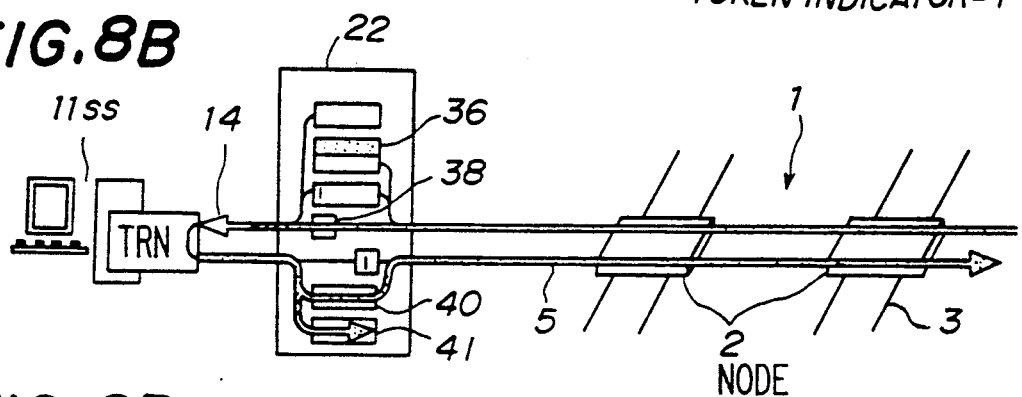
Figure 8B:
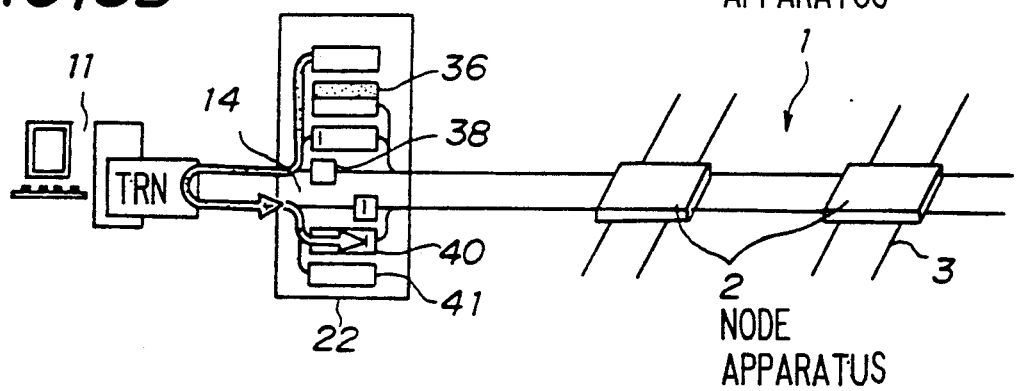

Next, as shown in FIG. 8B, the TAU 22 outputs the message information 5 which is looped back from the receiving TRN terminal $11_{DS}$ to the transmitting TRN terminal $11_{SS}$ by the reception FIFO gate 38 in synchronism with the signal "0" which is being output. A path is fixed in the lattice communication network 1 by the looped back message information 5.

Thereafter, as shown in FIG. 8C, the transmitting TRN terminal $11_{SS}$ outputs the free token 14 by confirming that the message information 5 reached the receiving TRN terminal $11_{DS}$ based on the frame copied indicator "1" of the looped back message information 5. However, the TAU 22 again absorbs the free token 14 which is output from the transmitting TRN terminal $11_{SS}$. The above described generation and absorbing of the free token 14 is repeated. If the message information 5 is not looped back from the receiving TRN terminal $11_{DS}$, the transmitting TRN terminal $11_{SS}$ retransmits the message information 5 in conformance with the TRN protocol.

Therefore, the address of the transmitting source is down loaded in the TAU 22 when the TRN terminal 11 outputs the message information 5 once. Thereafter, the TAU 22 carries out a control for receiving the message information 5. The address is updated automatically.

Reception of Message Information

Figure 9A:
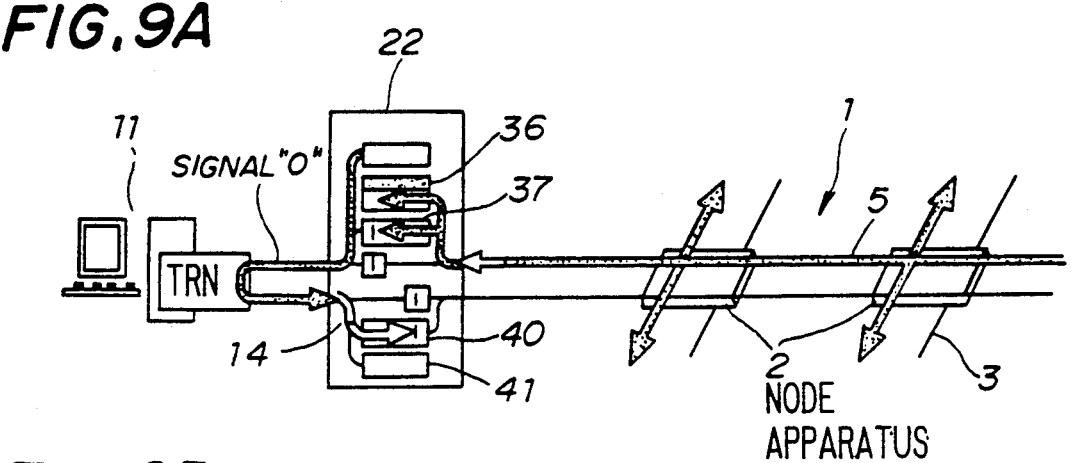
FIGS. 9A through 9C are diagrams for explaining reception of message information.
Figure 9B:
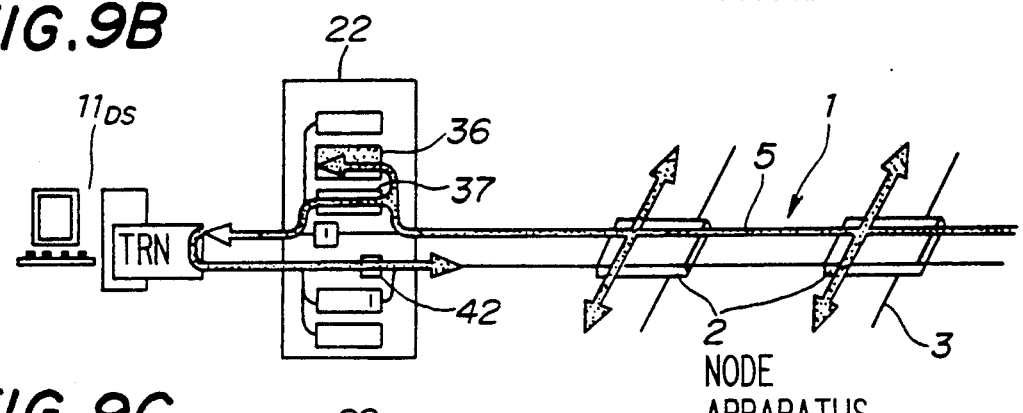
Figure 9C:
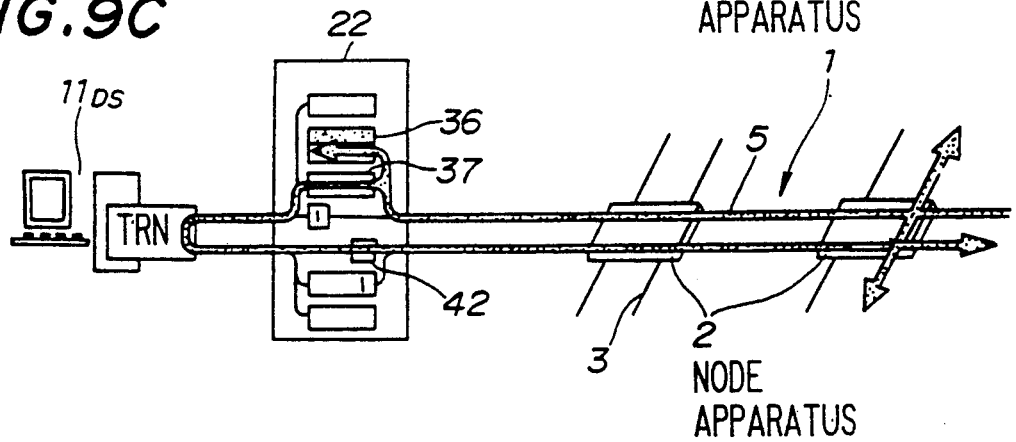

A description will be given of the operation of the receiving TRN terminal $11_{DS}$. The TAU 22 again outputs to the lattice communication network 1 only the looped back message information 5 from the receiving TRN terminal $11_{DS}$. As shown in FIG. 9A, when the TAU 22 receives the message information 5 from the lattice communication network 1, the TAU 22 stops the free token generator 35 from outputting the free token 14. Then, as shown in FIG. 9B, the TAU 22 outputs the message information 5 from the reception register 37 to the TRN terminal 11 with an interval from the free token 14 and in synchronism with the signal "0" which is being output. Thereafter, as shown in FIG. 9C, the TAU 22 discriminates the destination address in the address comparing register 36 and opens the transmission through gate 42 when the destination address matches the address of the connected TRN terminal 11. As shown in FIG. 9C, the TAU 22 outputs the message information 5 which is looped back from the receiving TRN terminal $11_{DS}$ from the transmission through gate 42 to the lattice communication network 1. Accordingly, the looped back message information 5 from the receiving TRN terminal $11_{DS}$ reaches the transmitting TRN terminal $11_{SS}$ by tracing the same path taken by the message information 5 which is transmitted from the transmitting TRN terminal $11_{SS}$ to the receiving TRN terminal $11_{DS}$, and a path is thereby fixed in the lattice communication network 1.

Transfer of Message Information

Figure 10A:
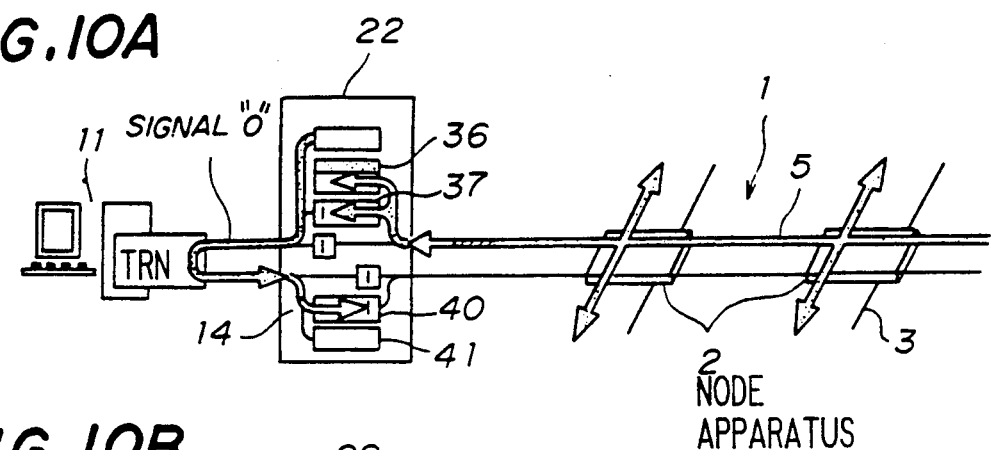
FIGS. 10A through 10C are diagrams for explaining transfer of message information.
Figure 10B:
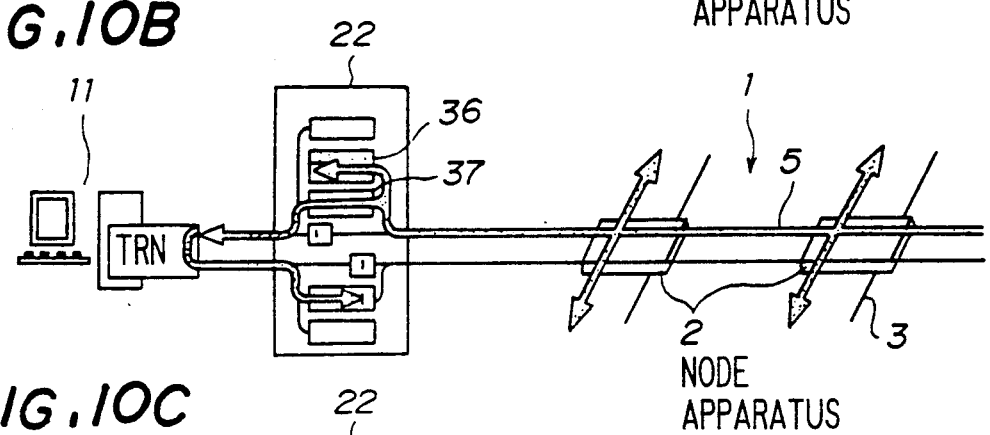
Figure 10C:
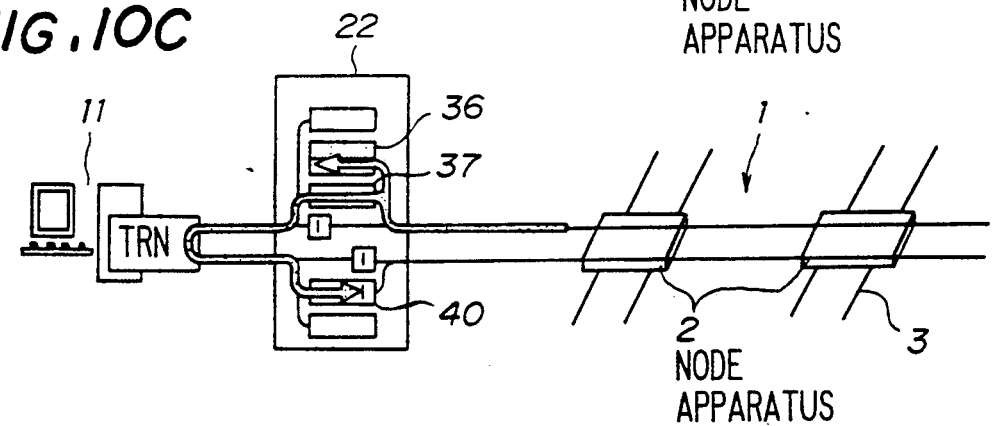

A description will be given of the TRN terminals 11 other than the receiving TRN terminal $11_{DS}$. The TAU 22 does not output to the lattice communication network 1 those message information 5 looped back from the TRN terminals 11 other than the receiving TRN terminal $11_{DS}$. First, as shown in FIG. 10A, when the TAU 22 receives the message information 5 from the lattice communication network 1, the TAU 22 stops the free token generator 35 from outputting the free token 14. Then, as shown in FIG. 10B, the TAU 22 outputs the message information 5 from the reception register 37 to the TRN terminal 11 with an interval from the free token 14 and in synchronism with the signal "0" which is being output. The TAU 22 discriminates the destination address in the address comparing register 36, but in this case, the destination address does not match the address of the connected TRN terminal 11. Thereafter, as shown in FIG. 10C, the TAU 22 absorbs by the transmission register 40 the message information 5 which is looped back from the receiving TRN terminal $11_{DS}$. However, the message information 5 is discontinued when the path is fixed in the lattice communication network 1.

Collision Processing

A collision of message information occurs under several conditions. In this embodiment, the transmitting TRN terminal $11_{SS}$ detects the collision when no looped back message information is returned and retransmits the message information.

First, a description will be given of a collision process between the transmitting TRN terminal $11_{SS}$ and the node apparatus 2 of the lattice communication network 1, by referring to FIGS. 11A through 11C.

Figure 11A:
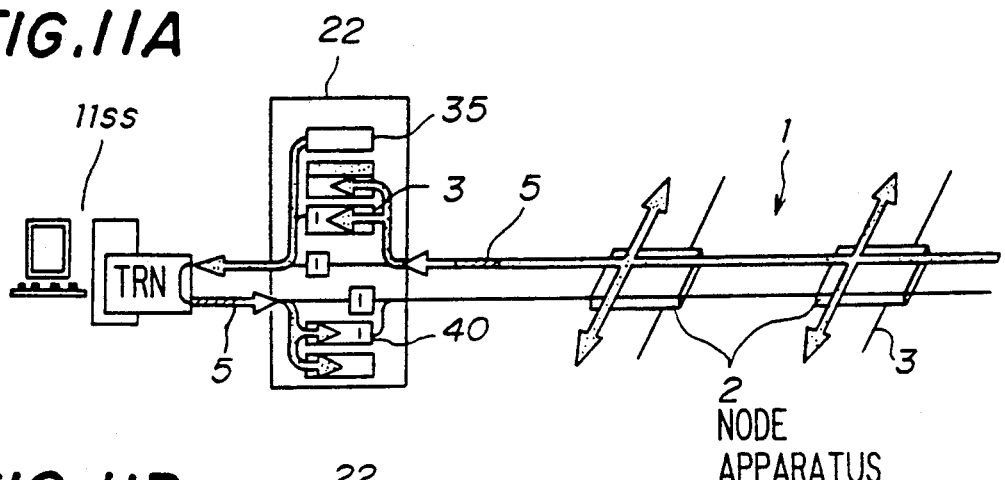
FIGS. 11A through 11C are diagrams for explaining a collision process between a TRN terminal and a TAU.
Figure 11B:
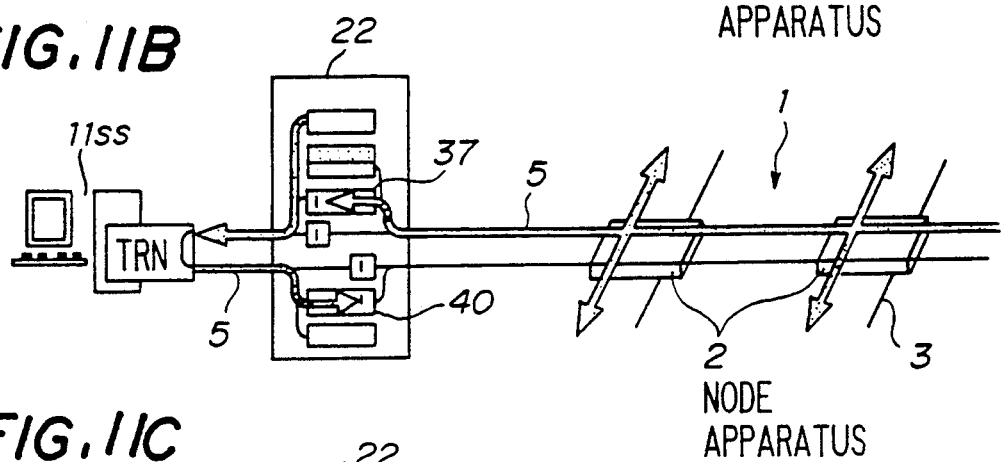
Figure 11C:
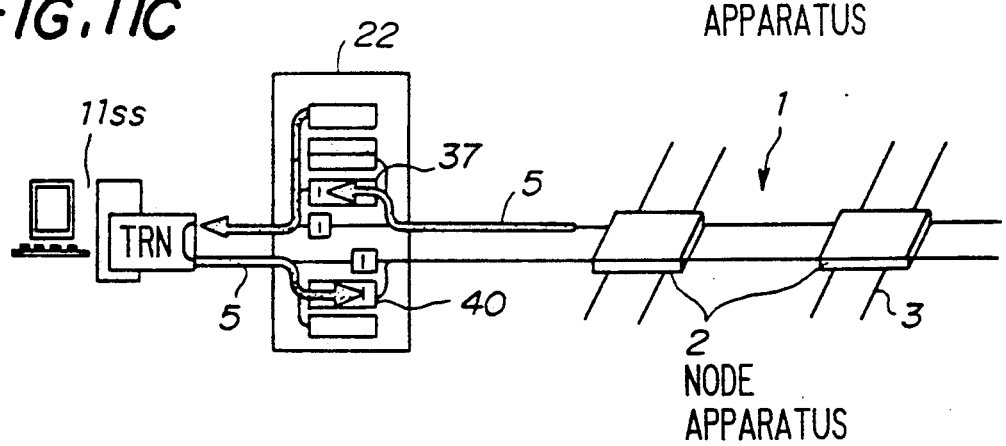

As shown in FIG. 11A, when the TAU 22 receives the message information 5 from the lattice communication network 1, the TAU 22 stops the free token generator 35 from outputting the free token 14. Then, as shown in FIG. 11B, the TAU 22 delays the output of the message information 5 to the TRN terminal 11 by the reception register 37. When the TAU 22 detects the message information 5 from the transmitting TRN terminal $11_{SS}$ by the transmission register 40, a collision is detected. Hence, in this case, the TAU 22 absorbs the message information 5 from the lattice communication network 1 by the reception register 37 and absorbs the message information from the transmitting TRN terminal $11_{SS}$ by the transmission register 40. As a result, as shown in FIG. 11C, the domain which includes the TRN terminal 11 and the TAU 22 is disconnected from the domain which includes the lattice communication network 1. Accordingly, when the transmitting TRN terminal $11_{SS}$ detects that the looped back message information is not returned, the transmitting TRN terminal $11_{SS}$ retransmits the message information 5 in conformance with the TRN protocol.

Next, a description will be given of a collision process between the TAU 22 and the node apparatus 2 of the lattice communication network 1, by referring to FIGS. 12A through 12C.

Figure 12A:
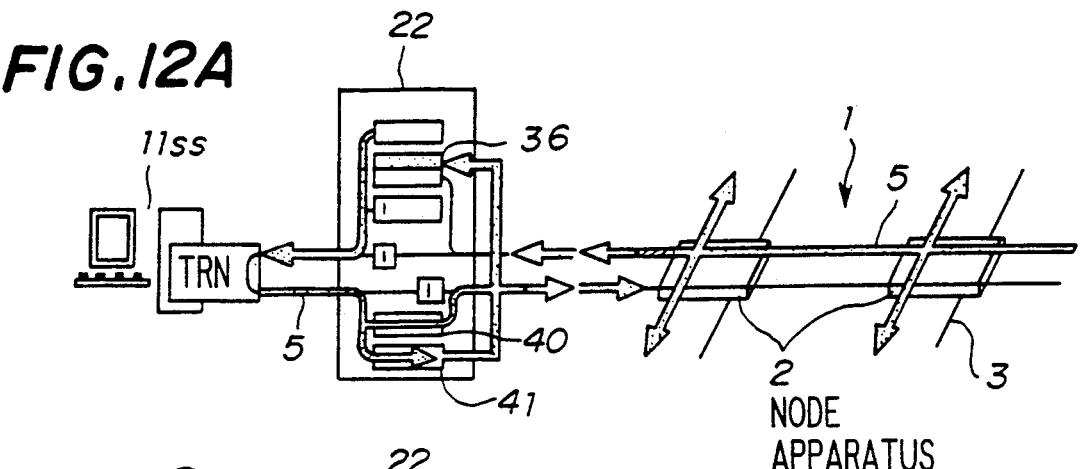
FIGS. 12A through 12C are diagrams for explaining a collision process between a TAU and a node apparatus.
Figure 12B:
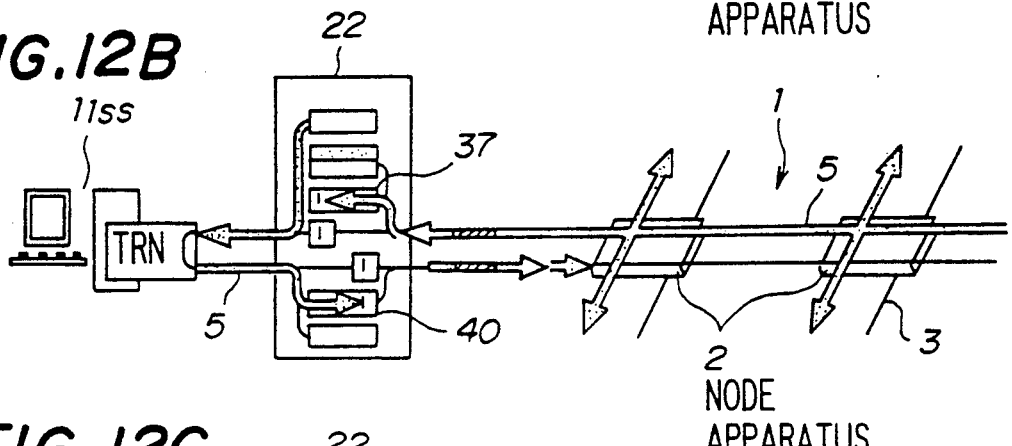
Figure 12C:
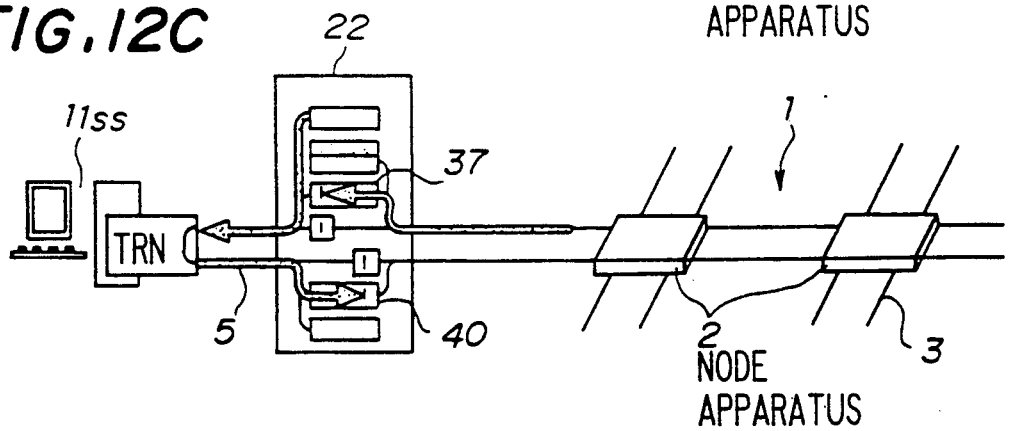

As shown in FIG. 12A, when the TAU 22 receives the message information 5 from the transmitting TRN terminal $11_{SS}$, the message information 5 is regarded as the preamble and a signal "0" is added to the preamble. The preamble and the added signal are output to the lattice communication network 1. In this state, when the TAU 22 detects the message information 5 from the lattice communication network 1 by the reception register 37 as shown in FIG. 12B, a collision is detected. In this case, the TAU 22 stops the transmission register 40 from making an output to the lattice communication network 1. As a result, the domain which includes the TRN terminal 11 and the TAU 22 is disconnected from the domain which includes the lattice communication network 1 as shown in FIG. 12C. When the transmitting TRN terminal $11_{SS}$ detects that the looped back message information 5 is not returned, the transmitting TRN terminal $11_{SS}$ retransmits the message information 5 in conformance with the TRN protocol.

Therefore, although a collision does not occur in the token ring network, a collision does occur when the TRN terminal 11 of the token ring network is coupled to the lattice communication network 1. The TAU 22 interrupts both the transmitting message information and the receiving message information when a collision is detected. On the other hand, the node apparatus 2 interrupts the message information when a collision is detected. As a result, when a collision is generated somewhere in the communication system in which the token ring network is coupled to the lattice communication network 1, the transmitting message information is not returned to the transmitting TRN terminal $11_{SS}$. In addition, even when the transmitting message information is returned to the transmitting TRN terminal $11_{SS}$, the returned message information may be incomplete, that is, interrupted at an intermediate part of the message information. Similarly, the receiving TRN terminal $11_{DS}$ may also receive incomplete message information.

In the token ring network alone, the reception of incomplete message information will not occur. For this reason, when the received message information is incomplete, it is treated as a fatal error, and the TRN terminal starts a complex process such as initializing the ring. However, when the token ring network is coupled to the lattice communication network 1, the reception of incomplete message information will occur, and the communication efficiency will be greatly deteriorated if the TRN terminal 11 were to start initializing the ring, for example.

Therefore, the collision process is carried out so that the reception of incomplete message information is not automatically treated as a fatal error, in order to ensure a satisfactory communication efficiency.

First, the transmitting TRN terminal $11_{SS}$ retransmits the message information 5 when the looped back message information 5 is not returned from the receiving TRN terminal $11_{SD}$ within a predetermined time.

Second, when the TRN terminal 11 receives incomplete message information, the TRN terminal 11 disregards this incomplete message information and outputs the free token 14 to enter the standby state for making a reception.

Figure 13:
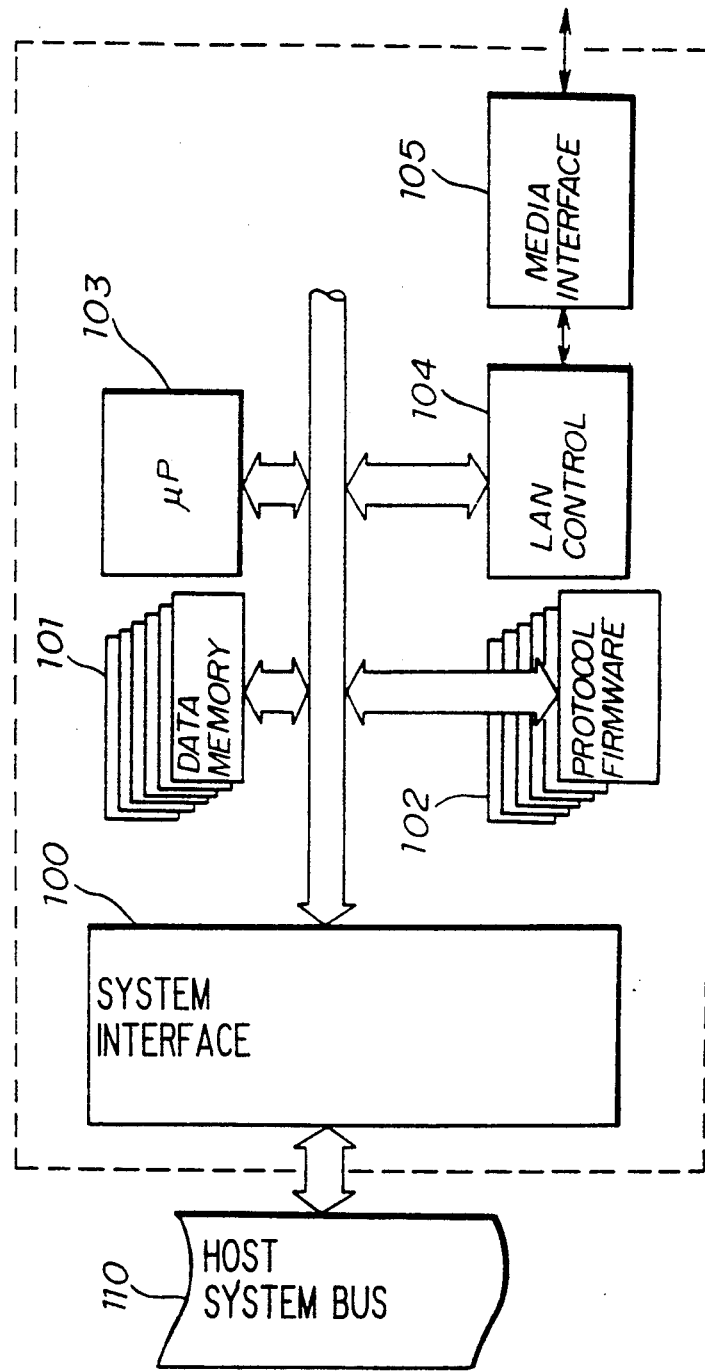
FIG. 13 is a system block diagram showing an embodiment of the TRN terminal.

FIG. 13 shows an embodiment of the TRN terminal 11. Generally, the TRN terminal includes a TRN interface which has the form of an adapter card. The TRN terminal 11 shown in FIG. 13 also has the form of the adapter card and includes a system interface 100 which couples to a host system bus 110, a data memory 101, a protocol firmware 102, a microprocessor 103, a LAN controller 104 and a media interface 105.

Figure 14:
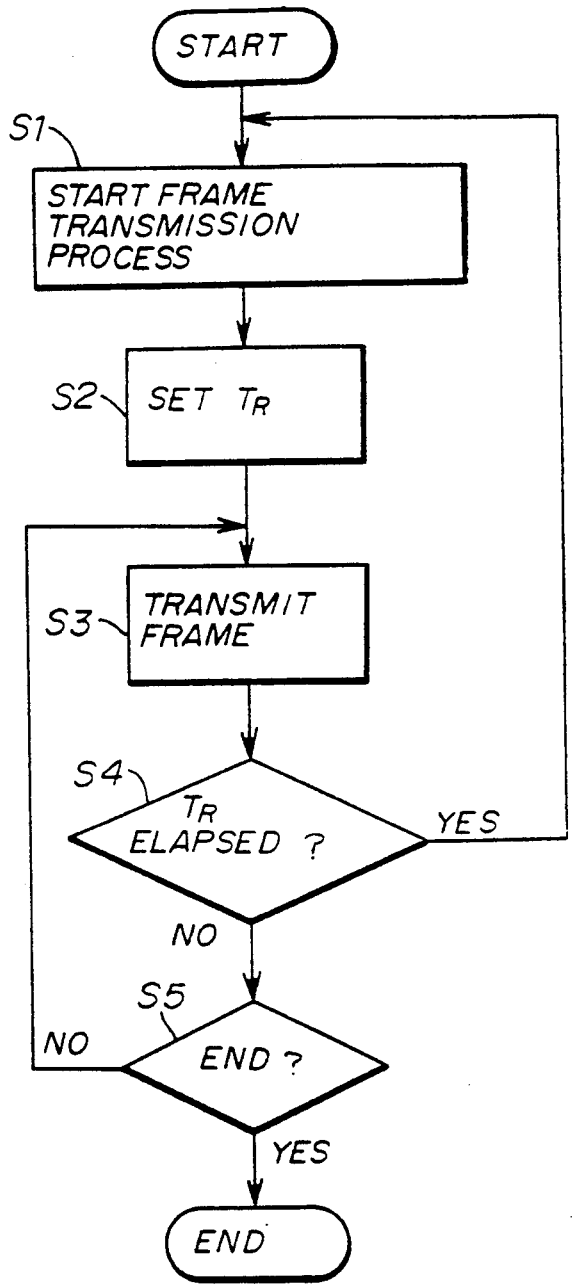
FIG. 14 is a flow chart for explaining a collision process of a transmitting TRN terminal.
Figure 15:
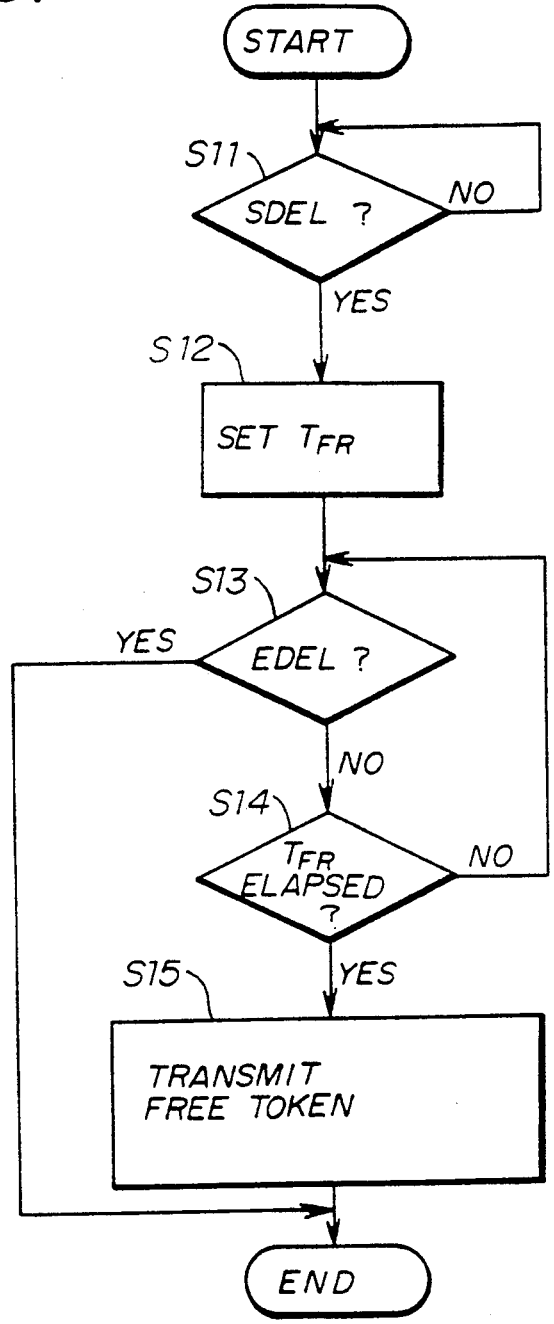
FIG. 15 is a flow chart for explaining a collision process of a receiving TRN terminal.

FIGS. 14 and 15 are flow charts for explaining the collision processes which are added to the existing programs of the protocol firmware 102. FIG. 14 shows the operation of the transmitting TRN terminal $11_{SS}$, and FIG. 15 shows the operation of the receiving TRN terminal $11_{DS}$.

In FIG. 14, a step S1 starts a frame transmission process, that is, the process of transmitting message information. A step S2 sets a timer $T_R$ which times the looped back frame which is returned from the receiving TRN terminal $11_{DS}$. A step S3 transmits the frame, and a step S4 judges whether or not the time set in the timer $T_R$ has elapsed. The process returns to the step S1 when the judgement result in the step S4 is YES. On the other hand, when the judgement result in the step S4 is NO, a step S5 judges whether or not the frame transmission has ended. The process returns to the step S3 when the judgement result in the step S5 is NO, but the process ends when the judgement result in the step S5 is YES.

When making a communication in the communication system in which the token ring network and the lattice communication network 1 are coupled, only the two TRN terminals $11_{SS}$ and $11_{DS}$ and the TAU 22 exist within the ring. For this reason, the time it takes for the frame transmitted from transmitting TRN terminal $11_{SS}$ to be looped back from the receiving TRN terminal $11_{DS}$ and returned to the transmitting TRN terminal $11_{SS}$ is a minimum time. Hence, the time which is set in the timer TR is set in the range of 5 ms which is shorter that that set for the normal token ring network alone.

In FIG. 15, a step S11 judges whether or not a start delimiter (SDEL) byte of the frame is detected. The SDEL byte indicates the beginning of the frame as will be described later in conjunction with the frame structure. When the judgement result in the step S11 becomes YES, a step S12 sets a timer $T_{FR}$ which times the frame length when a part of the frame drops out. The time set in the timer $T_{FR}$ depends on the frame length used, but in the case of a normally used frame which is 4 kbytes long, this time is in the range of 2 ms.

A step S13 judges whether or not an end delimiter (EDEL) byte of the frame is detected. As will be described later in conjunction with the frame structure, the EDEL byte indicates the end of the frame. The process ends when the judgement result in the step S13 is YES. On the other hand, when the judgement result in the step S13 is NO, a step S14 judges whether or not the time set in the timer $T_{FR}$ has elapsed. The process returns to the step S13 when the judgement result in the step S14 is NO. But when the judgement result in the step S14 is YES, a step S15 transmits the free token 14 and the process ends.

FIG. 16A shows the relationship of the transmitted frame and the returned frame for a normal case where no collision occurs. FIG. 16B shows a case where a part of the returning frame drops out as indicated by a phantom line. In addition, FIG. 16C shows a case where no returning frame is detected. In FIGS. 16B and 16C, $T_{FR}$ and $T_R$ respectively correspond to the times set in the timer $T_{FR}$ described in conjunction with FIG. 15 and the timer $T_R$ described in conjunction with FIG. 14.

Next, a description will be given of a second embodiment of the present invention.

This embodiment has the function of down loading the source address thereof so that the set address can be changed without making a change in the network interface unit even when the physical address of the token ring network/lattice communication network connecting terminal changes.

Figure 17:
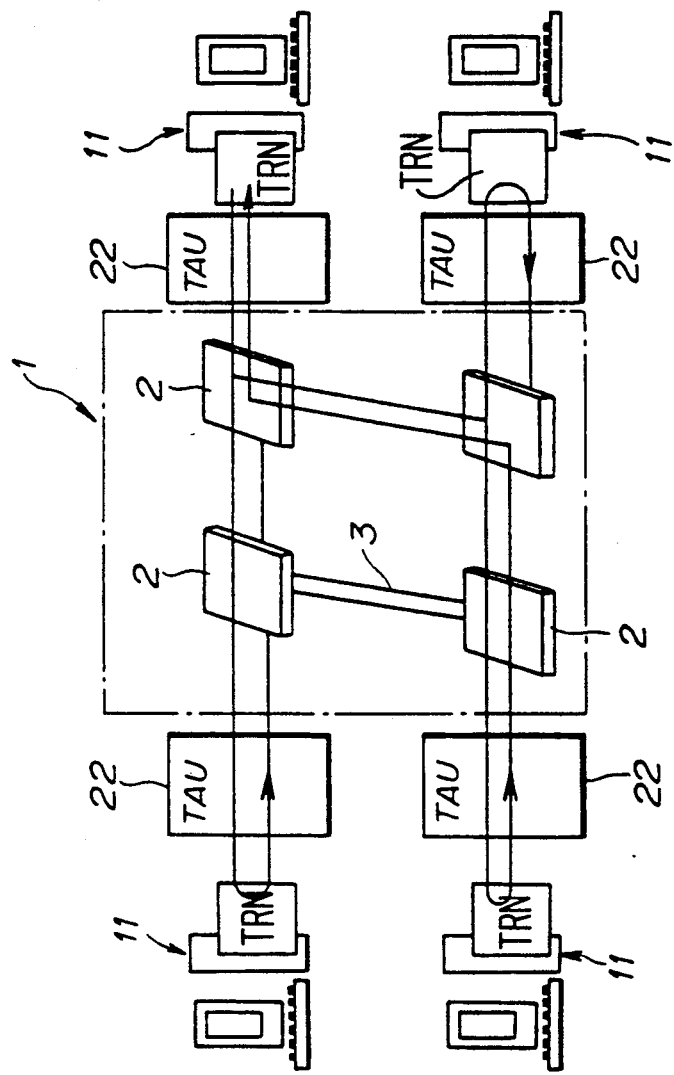
FIG. 17 is a diagram for explaining the connection of TRN terminals and a lattice communication network in a second embodiment of the invention.

FIG. 17 shows the connection of the TRN terminal 11 and the lattice communication network 1 via network interface units. In this embodiment, the connection is achieved by use of the TAUs 22 alone.

Figure 18:
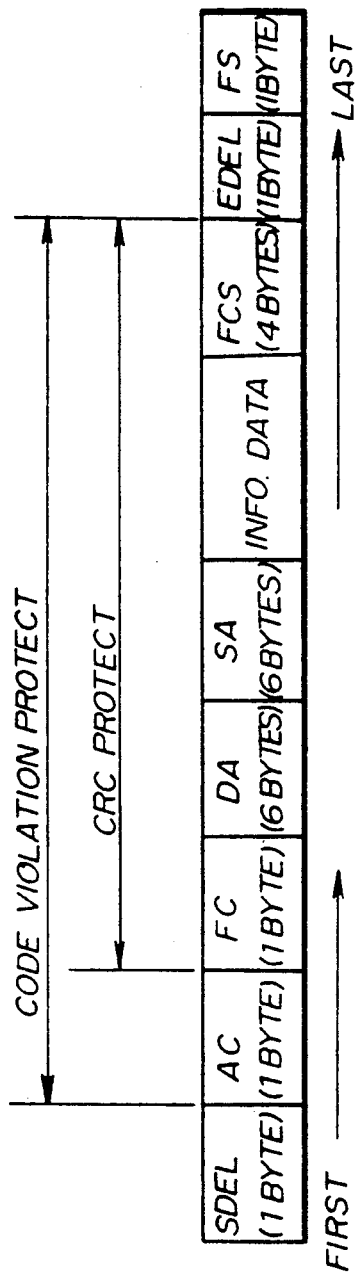
FIG. 18 is a diagram showing a frame structure in the data link layer of a token ring network.

FIG. 18 shows the frame structure in the data link layer of the token ring network. The frame is made up of the SDEL byte, an access control (AC) byte, a frame control (FC) byte, destination address (DA) bytes which amount to 6 bytes, source address (SA) bytes which amount to 6 bytes, information data, four bytes of frame check sequence (FCS), the EDEL byte and a frame status (FS) byte.

A general description will be given of the address down load at the time of the signal transmission. The TRN terminal 11 and the TAU 22 are coupled via the token ring network. Accordingly, between the TRN terminal 11 and the TAU 22, when the TAU 22 receives the free token from the TRN terminal 11, the TAU 22 transmits the input frame when the input frame is received from the lattice communication network 1 and transmits the free token when no input frame is received from the lattice communication network 1. The TRN terminal 11 receives the frame from the TAU 22 when this frame is intended for this TRN terminal 11, and sets the copy indicator of the AC byte. The TRN terminal 11 returns the AC byte with the set copy indicator to the TAU 22. In addition, when the TRN terminal 11 receives the free token, the TRN terminal 11 outputs a frame when this frame is to be transmitted, and otherwise returns the free token to the TAU 22. In other words, the frame which is transmitted to the TAU 22 immediately after the TAU 22 transmits the free token is the frame which is transmitted from the TRN terminal 11. Hence, the source address of this frame is down loaded.

Figure 19:
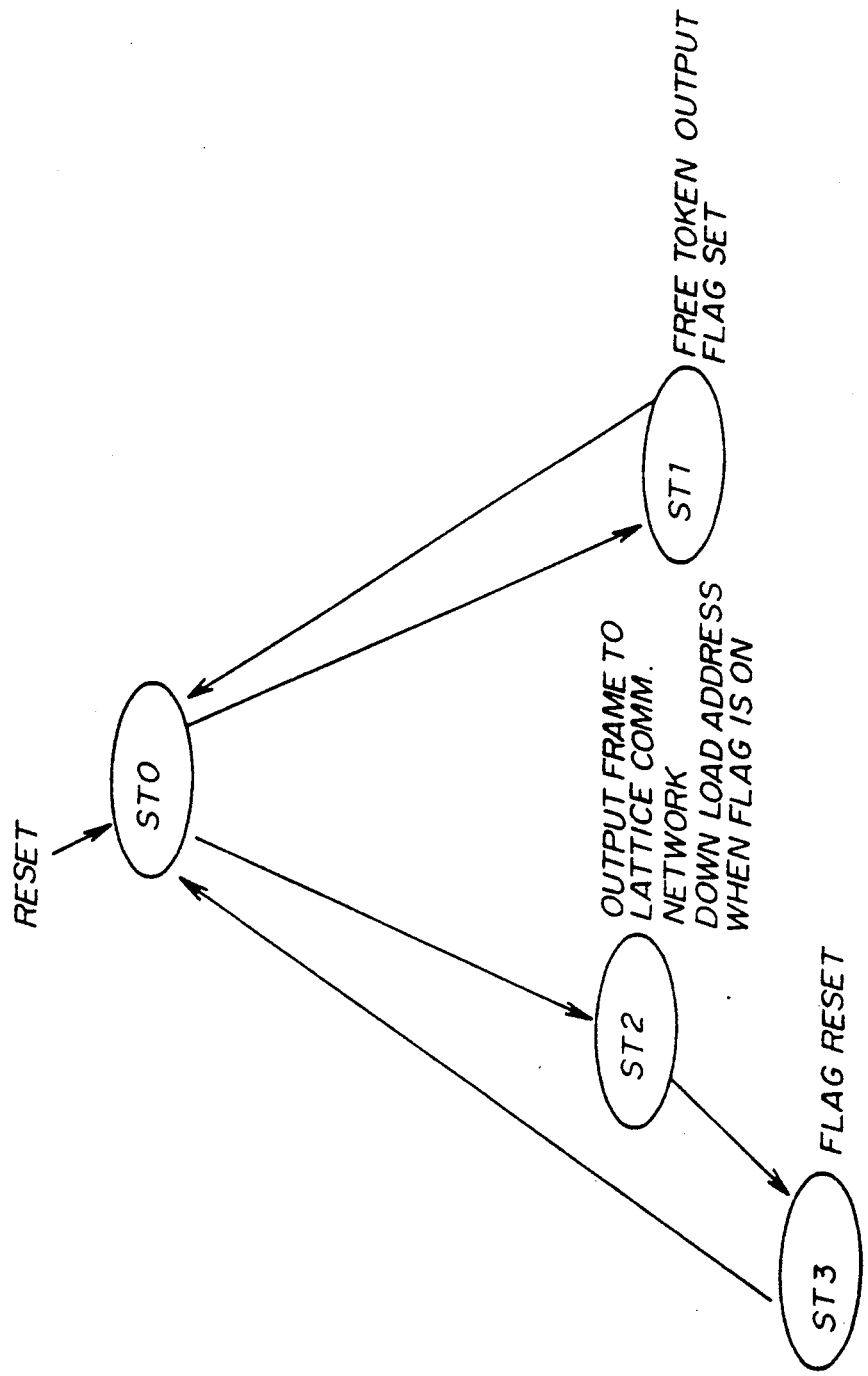
FIG. 19 is a state transition diagram of an address down load in the TAU.

FIG. 19 is a state transition diagram of the address down load in the TAU 22. First, ST denotes an idle state, that is, a state in which the TAU 22 waits for the input of free token or frame. The state changes from the idle state ST0 to a state ST1 when the TAU 22 receives the free token, and the state changes from the idle state ST0 to a state ST2 when the TAU 22 receives the frame. In the state ST1 in which the TAU 22 receives the free token, a flag is set and the free token is output to return the state to the idle state ST0. On the other hand, in the state ST2, the TAU 22 outputs the received frame to the lattice communication network 1. In this case, if the flag is set, it is immediately after the free token is output, and thus, the source address within the received frame is down loaded. After this process ends, the state changes to a state ST3. In the state ST3, the flag is reset and the state is returned to the idle state ST0.

Figure 20:
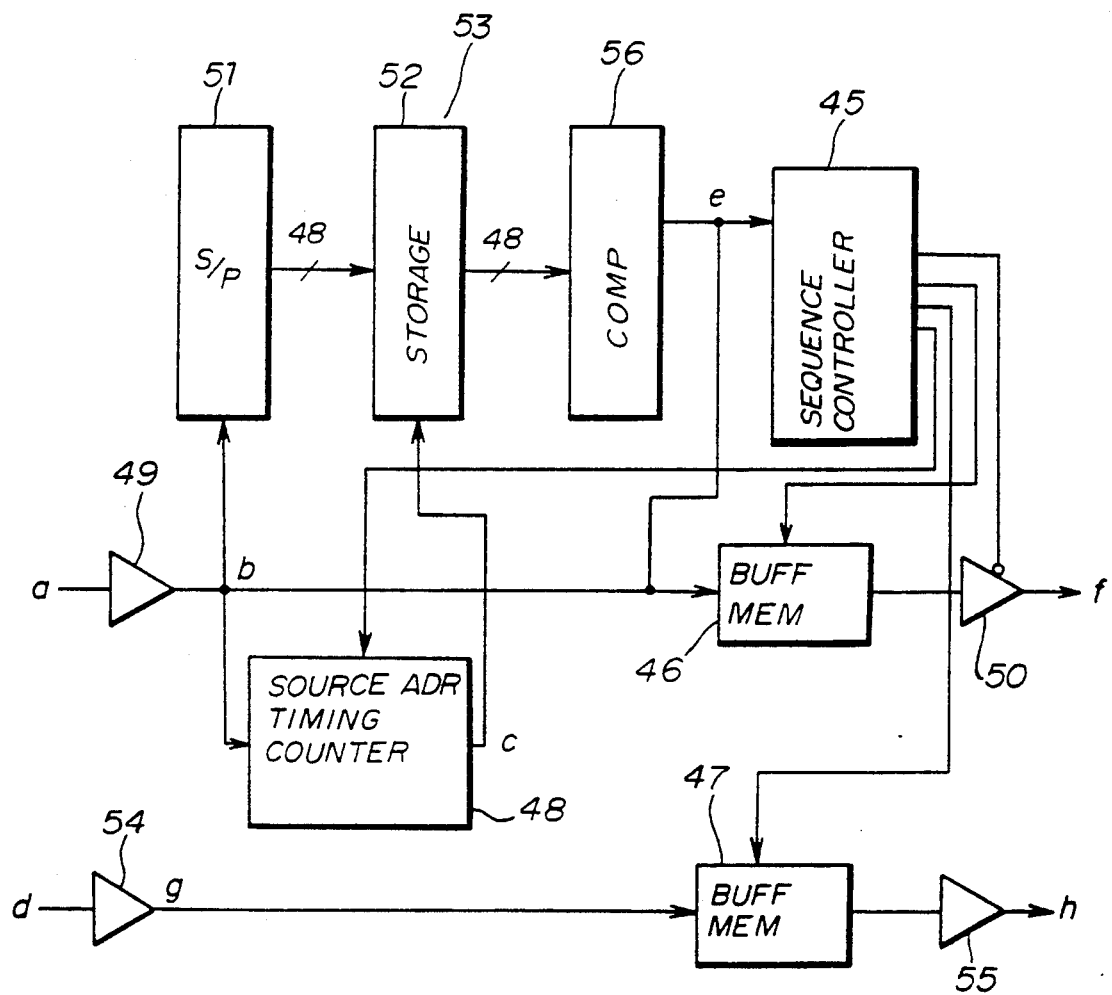
FIG. 20 is a system block diagram showing an embodiment of a circuit which makes a down load.

FIG. 20 shows an embodiment of a circuit for making the down load described above. The circuit shown in FIG. 20 includes a sequence controller 45, buffer memories 46 and 47, a source address timing counter 48, receivers 49 and 54, drivers 50 and 55, a serial-to-parallel (S/P) converter 51, an address storage 52 and a comparator 56 which are connected as shown.

The sequence controller 45 controls the operation sequence of the circuit according to the state transition diagram shown in FIG. 19. Particularly, the sequence controller 45 controls the buffer memories 46 and 47 which respectively have a FIFO structure, and the source address timing counter 48.

The receiver 49 receives an input signal a from the TRN terminal 11 which is connected to the TAU 22. The receiver 49 converts the input signal a into a signal b which is output to the lattice communication network 1 as an output signal f via the buffer memory 46 and the driver 50. The S/P converter 51 also receives the signal b. For example, the S/P converter 51 is made up of a 48-bit shift register, and an output of the S/P converter 51 is supplied to the address storage 52 which is made up of a D-type flip-flop or a random access memory (RAM).

Figure 21:
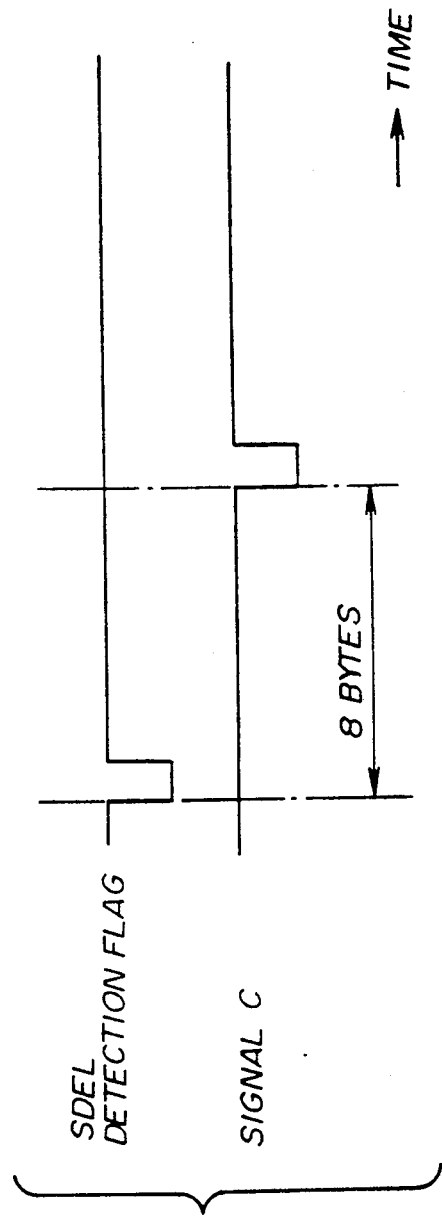
FIG. 21 is a time chart for explaining an operation of a source address timing counter shown in FIG. 20.

The source address timing counter 48 receives the signal b from the receiver 49 and functions as a discriminating means. That is, in the frame structure shown in FIG. 18, the source address timing counter 48 generates a signal c shown in FIG. 21 which is asserted with a timing corresponding to the eighth byte counted from the detection of the SDEL byte and such that the token indicator immediately after the detection of the SDEL byte indicates the frame. This signal c is supplied to the address storage 52 so that the output of the S/P converter 51 is stored in the address storage 52 with a timing determined by the signal c. The detection of the SDEL byte determines the start of the source address timing counter 48, and this detection of the SDEL byte can be made by a known method.

At the timing when the signal c is asserted, the data in the S/P converter 51 is of course the source address SA within the frame shown in FIG. 18. Since the source address is automatically stored in the address storage 52 in the above described manner, it becomes possible to down load the address of the connected TRN terminal 11 in the TAU 22. The source address timing counter 48 and the address storage 52 form a terminal address storage means 53.

The usage of the down loaded terminal address will now be described in conjunction with the signal reception operation. First, an input signal d which is input from the lattice communication network 1 is always the frame, and this input signal d is converted into a signal g by the receiver 54. Similarly as in the case of the signal b, the signal g is output to the TRN terminal 11 as a signal h via the buffer memory 47 and the driver 55. At the TRN terminal 11, the copy indicator of the AC byte is set when the received frame is intended therefor and returns the frame to the TAU 22. The returned frame from the TRN terminal 11 corresponds to the input signal a.

When the flag is not set in this state, the frame received by the TAU 22 is not a transmitting frame from the connected TRN terminal 11, but is a returned frame which originates from another TRN terminal 11 and is returned by the connected TRN terminal 11. The source address of the received frame is compared with the address of the connected TRN terminal 11 in the comparator 56, and the sequence controller 45 opens the driver 50 in response to an output signal e of the comparator 56 when the two compared addresses match. When the driver 50 is opened, a signal f is output to the lattice communication network 1 as an acknowledge signal intended for the node apparatus 2 of the lattice communication network 1.

On the other hand, when the two compared addresses do not match in the comparator 56, the sequence controller 45 closes the driver 50 in response to the output signal e of the comparator 56 and interrupts the frame.

Therefore, by comparing the down loaded address and the address of the looped back signal of the received frame in the TAU 22, it is possible to loop back to the node apparatus 2 of the lattice communication network 1 only the frame intended for the TRN terminal 11 which is connected to the TAU 22. As a result, it is possible to efficiently fix the path in the lattice communication network 1.

In the description given above, the comparator 56 compares all 48 bits of the two addresses in one operation. However, it is of course possible to compare the two address in a plurality of operations, such as comparing 8 bits at a time and making 6 such operations and comparing 16 bits at a time and making 3 such operations. When comparing the two addresses in a plurality of operations, it is preferable to use the RAM as the address storage.

Figure 22:
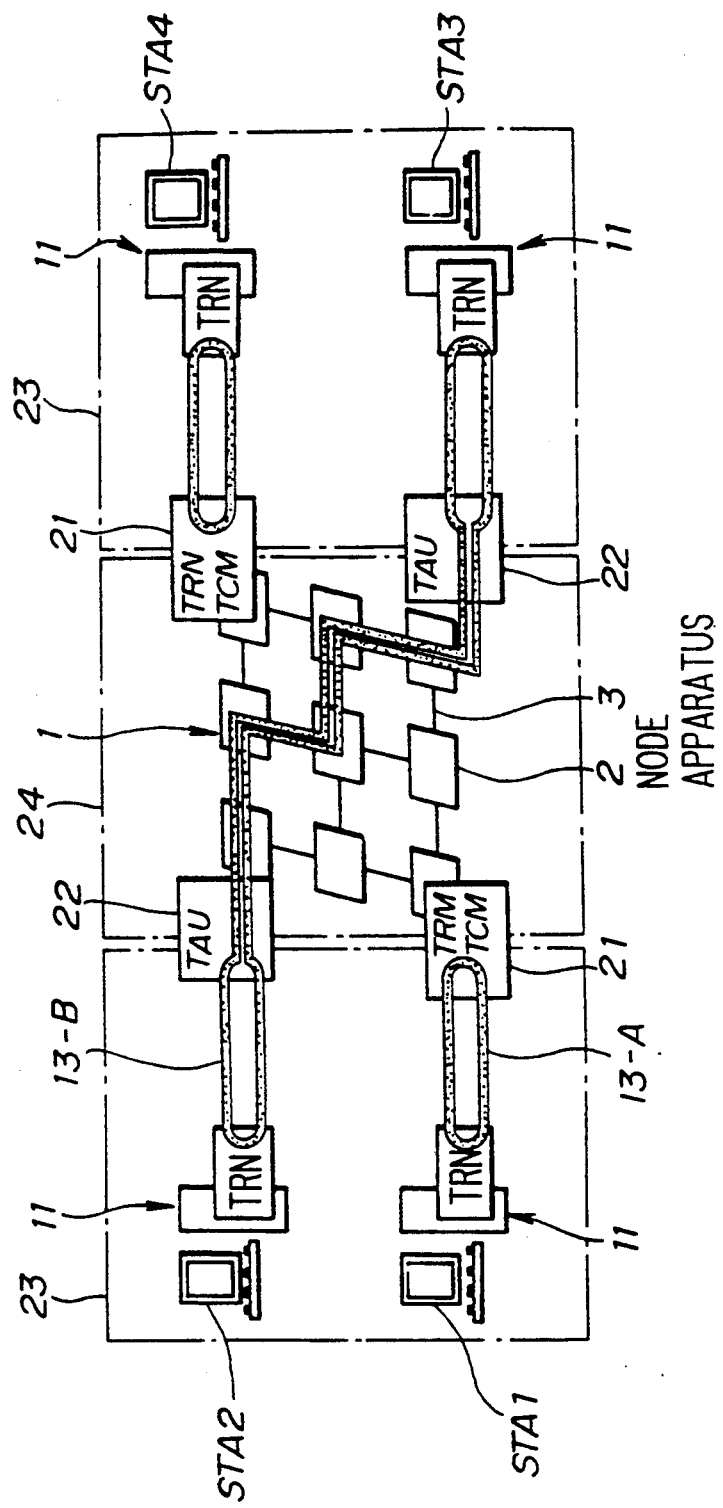
FIG. 22 is a diagram for explaining a third embodiment of the present invention.

Next, a description will be given of a third embodiment of the present invention, by referring to FIG. 22. In FIG. 22, those parts which are the same as those corresponding parts in FIG. 4 are designated by the same reference numerals, and a description thereof will be omitted.

In the communication system shown in FIG. 22, a link 13-A indicates a path which is formed when a station STA1 is not making a communication, that is, when the station STA1 is in a communication standby state. In this case, a ring is formed between only the station STA1 and the TRN TCM 21. In addition, the link 13-A is disconnected from the lattice communication network 1.

On the other hand, a link 13-B indicates a path which is formed when a communication is made between a station STA2 and a station STA3. In this case, a ring is formed by the station STA2, the TAU 22 which is connected to the station STA2, the fixed path within the lattice communication network 1, the TAU 22 which is connected to the station STA3, and the station STA3.

Therefore, as may be seen from FIG. 22, the communication system may have a plurality of independent rings formed therein.

For example, the token ring network to which the present invention may be applied is a token ring LAN in conformance with the IEEE 802.5 standards.

Figure 23:
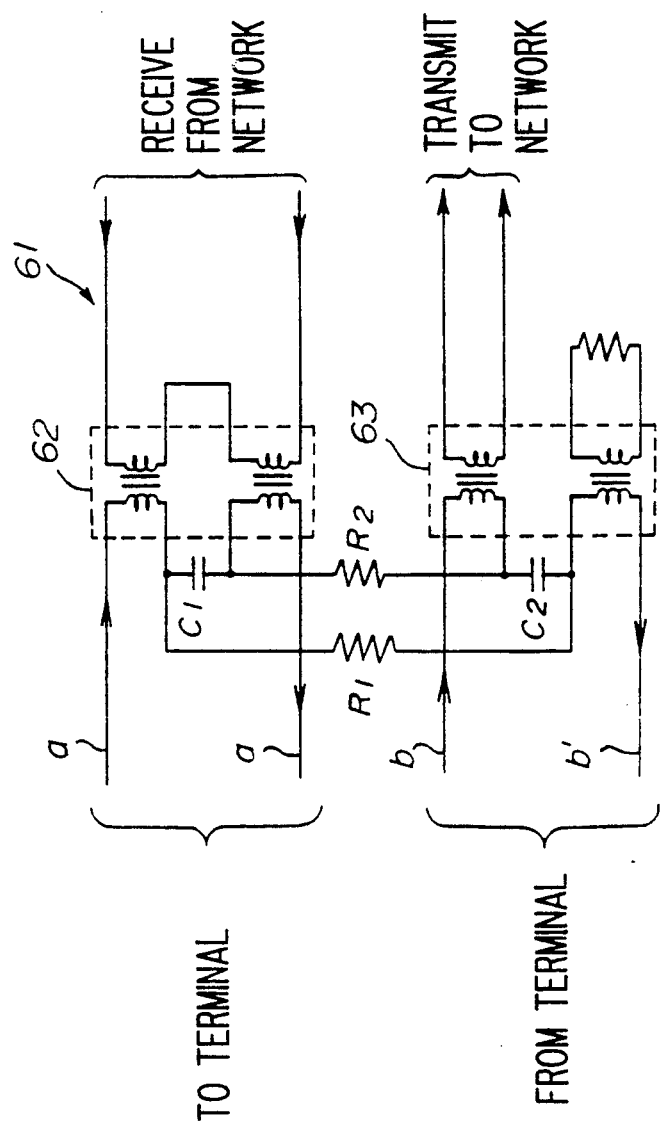
FIG. 23 is a diagram showing a network interface unit in a fourth embodiment of the invention.

Next, with reference to FIG. 23, a description will be given of a network interface unit for coupling the lattice communication network (which is hereinafter called simply the network) and the token ring network (which is hereinafter called the TRN), to which an embodiment of the present invention is applied. A terminal of the token ring network applies a phantom signal to the network interface unit, and detects from a detection signal received from the network interface unit whether or not the terminal is normally coupled to the lattice communication network via the network interface unit. In the network interface unit shown in FIG. 23, a transmitting/receiving part 61 includes transformers 62 and 63 which electrically connect signal lines, coupled to a terminal connection port of the network interface unit connected to a terminal (or a station) of the TRN via the cable, and signal lines, coupled to a node apparatus connection port of the unit which is also connected to a node apparatus of the lattice communication network. The signal lines from the TRN terminal include input lines "a" and "a'" and output lines "b" and "b'". The input lines "a" and "a'" correspond to a receiving line of the transmitting/receiving part 61 through which line a signal is received from the network, and the output lines "b" and "b'" correspond to a transmitting line of the part 61 through which line a signal is transmitted to the network. In the network interface unit of the present invention, two phantom signal paths, through which a phantom signal is supplied from the TRN terminal to the network interface unit and returned to the TRN terminal, are formed. One of the two paths is formed by the line "a", the transformers 62, 63 and the line "b'", and the other path is formed by the line "b", the transformers 62, 63 and the line "a'". As shown in FIG. 23, there are two capacitors C1 and C2 connected between the two phantom signal paths.

According to the network interface unit shown in FIG. 23, two resistors R1 and R2 are connected in the above described phantom signal paths, respectively, and each of the resistors R1 and R2 has a preset resistance that allows an appropriate dc current to flow through the signal lines in response to the applied phantom signal. If an abnormally high dc current is detected, the TRN terminal judges that a fault has taken place in the connection between the network and the network interface unit. Also, if an abnormally low dc current is detected, the TRN terminal judges that a fualt has taken place in the connection between the TRN terminal and the network interface unit. Thus, it is possible to provide suitable interface between the TRN terminal and the network, thus allowing for the establishment of communications between them.

Next, with reference to FIG. 24, a description will be given of a transmission path switching part which is provided within the network interface unit shown in FIG. 23. In FIG. 24, those parts which are the same as those corresponding parts in FIG. 23 are designated by the same reference numerals, and a description thereof will be omitted.

In the network interface unit shown in FIG. 24, a transmission path switching part 64 is provided for switching a transmission path selectively depending on whether or not a phantom signal has been supplied from the TRN terminal. This transmission path switching part 64 includes a relay driver 65 provided in the phantom signal paths on the primary side of the transformers in which the resistors R1 and R2 are connected, a relay 66 in the receiving line from the network to which line signal lines "c" and "c'" of the transmitting/receiving part 61 on the secondary side of the transformers are coupled, and a relay 67 in the transmitting line to the network to which line signal lines "d" and "d'" of the transmitting part 61 are coupled. These relays 66 and 67 are driven by the relay driver 65, and a condition of the transmission path between the network interface unit and the network is controlled. The relay 66 includes contact points 1a and 2a, the contact points 1a being coupled to the signal lines "c" and "c'" and the contact points 2a being coupled to the signal lines "d" and "d'" downstream of the relay 67 on the terminal's side of the relay 67 opposite to the network.

In the network interface unit thus constructed as shown in FIG. 24, the relay driver 65 is activated by either a phantom signal which is sent from the signal line "a" to the signal line "b'" through the resistor R1 or a phantom signal which is sent from the signal line "b"

to the signal line "a'" through the resistor R2. When a phantom signal has not appeared, the relay 66 is switched by the relay driver 65 so that the contact points 2a are placed in ON state and the relay 67 is placed in OFF state, as shown in FIG. 24. Thus, a signal which is sent by the TRN terminal is not transmitted to the network via the node apparatus connection port, but instead is returned back to the TRN terminal, and a signal sent from the network is stopped from entering the network interface unit via the node apparatus connection port because the contact points 1a of the relay 66 are placed in an open circuit condition. Thus, it is possible for the TRN terminal to transmit the LMT frame to the network interface unit and receive the LMT frame from the network interface unit, when a phantom signal has not been applied to the network interface unit.

After a phantom signal is applied by the TRN terminal, the relay driver 65 is activated by the phantom signal and the relays 66 and 67 are driven by the relay driver 65 so that the contact points 1a of the relay 66 are placed in ON state and the relay 67 is changed into ON state. Thus, a normal transmission path is formed, this normal condition of the transmission path being the same as that shown in FIG. 23, and message information can be exchanged between the TRN terminal and the network via the transmission path. Accordingly, prior to the output of the phantom signal, the LMT frame can be transmitted from the TRN terminal and immediately returned to the TRN terminal from the network interface unit, because the transmission path between the lattice communication network and the network interface unit is blocked by the transmission path switching part. Hence, it is possible to ensure a safe interface between the token ring network and the lattice communication network, thus ensuring the survival of data.

Further, the present invention is not limited to these embodiments, and variations and modifications may be made without departing from the scope of the present invention.

What is claimed is:

1. A network interface unit for coupling a lattice communication network and at least one token ring network, said lattice communication network having a multi-conjunction architecture and comprising:
 a plurality of node apparatuses;
 a plurality of first terminals; and
 a plurality of transmission paths each coupling one node apparatus to another node apparatus or a first terminal,
 each node apparatus including an input port comprising a plurality of input channels connected to the transmission paths, an output port comprising a plurality of output channels connected to the transmission paths, a switching gate part for coupling the input and output channels of the input and output ports, and control means for controlling the switching gate part to selectively couple one of the input channels which receives a digital signal first to all the output channels other than one of the output channels having a channel number corresponding to a channel number of said one input channel according to a first-input-first-output logic, said token ring network comprising:

at least one second terminal which function as one of transmitting and receiving second terminals; and
 a cable which is coupled to the second terminal and forms a ring, a carrier signal and a free token being recirculated around the ring of the cable even in a standby state,
 said transmitting second terminal catching the free token and transmitting message information which is added to a busy token,
 said receiving second terminal copying the message information which is received and returning the message information which is added with a copy code,
 said transmitting second terminal entering the message information which is returned from said receiving second terminal and outputting a free token when an establishment of a communication is confirmed from the copy code,
said network interface unit comprising:
 a terminal connection port coupled to the second terminal of the token ring network via the cable;
 a node apparatus connection port coupled to the node apparatus of the lattice communication network;
 a free token generator, coupled to said terminal connection port and said node apparatus connection port, for intermittently generating a carrier signal and a free token and outputting the generated carrier signal and free token to said terminal connection port when no carrier signal has been received from said node apparatus connection port;
 a token detector, coupled to said terminal connection port, for detecting whether a free token or message information has been received from said terminal connection port, said token detector absorbing the free token when the free token is detected and outputting the message information and a carrier signal to said node apparatus connection port when the message information is detected so as to broadcast the message information within the lattice communication network;
 an address detector, coupled to said terminal connection port and said node apparatus connection port, for detecting, from the message information received from said terminal connection port, and storing a source address of the transmitting second terminal connected to the token ring network and detecting from the message information received from said node apparatus connection port whether or not a destination address matches the stored source address;
 reception register means, coupled to said node apparatus connection port and said terminal connection port, for stopping said free token generator from generating the free token when message information is received from the lattice communication network via said node apparatus connection port and for outputting the message information received from the lattice communication network to said terminal connection port; and
 a sequence controller coupled to and controlling said free token generator, said address detector and said reception register means,
said sequence controller controlling said token detector and said reception register means so that the message information received from said node apparatus connection port is looped back from the token ring network via said terminal connection port and output from said node apparatus connection port when said address detector detects that the destination address matches the stored source address, and the message information received from said node apparatus connection port is looped back from the token ring network via said terminal connection port and absorbed when said address detector detects that the destination address does not match the stored source address.

2. The network interface unit as claimed in claim 1, wherein said reception register means outputs the message information received from the lattice communication network via said node apparatus connection port to said terminal connection port in synchronism with the carrier signal which is being output from said free token generator.

3. The network interface unit as claimed in claim 1, wherein the carrier signal is a signal "0" in a differential Manchester code.

4. The network interface unit as claimed in claim 1, wherein said token detector includes a transmission register which distinguishes the free token from the message information by reading a token indicator of a signal which is received from said terminal connection port.

5. The network interface unit as claimed in claim 4, wherein said address detector includes an address comparing register which compares the destination address of the message information received from said node apparatus connection port with the stored source address, said token detector further including a down load register which reads the source address of the transmitting second terminal from the message information received from said terminal connection port and down loads the source address into said address comparing register.

6. The network interface unit as claimed in claim 4, wherein said transmission register absorbs the message information which has been received from said node apparatus connection port and looped back from the token ring network via said terminal connection port when said address detector detects that the destination address does not match the stored source address.

7. The network interface unit as claimed in claim 1, wherein said reception register means includes gate means for looping back the message information received from said node apparatus connection port via the token ring network and said terminal connection port to be output from said node apparatus connection port when said address detector detects that the destination address matches the stored source address, and absorbing the message information which is received from said node apparatus connection port and looped back from the token ring network via said terminal connection port when said address detector detects that the destination address does not match the stored source address.

8. The network interface unit as claimed in claim 1, wherein said token detector detects a collision when said reception register means delays outputting message information, which has been received from said node apparatus connection port, to said terminal connection port and said token detector detects message information received from the transmitting second terminal via said terminal connection port, and said reception register means absorbs the message information received from said node apparatus connection port and said token detector absorbs the message information received from said terminal connection node when said token detector detects the collision, thereby disconnecting the token ring network and the lattice communication network.

9. The network interface unit as claimed in claim 1, wherein said token detector detects a collision when said token detector receives message information from said terminal connection port and said reception register means receives message information from said node apparatus connection port, and said token detector stops outputting the message information, which has been received from said terminal connection port, to said node apparatus connection port when said token detector detects the collision, thereby disconnecting the token ring network and the lattice communication network.

10. The network interface unit as claimed in claim 1, wherein said second terminal applies a phantom signal to the terminal connection port of the network interface unit and detects from a detection signal received from the terminal connection port whether or not the second terminal is connected normally to the network interface unit, said network interface unit comprising phantom signal means, coupled to the terminal connection port, for outputting said detection signal to said second terminal via the terminal connection port when the applied phantom signal has been received, said phantom signal means including a set of resistors, coupled to the terminal connection port, each of said resistors having a resistance that produces a level of said detection signal appropriate for the second terminal to detect the connection of the second terminal to the network interface unit.

11. The network interface unit as claimed in claim 10, wherein said phantom signal means comprises switching means, coupled to the terminal connection port and the node apparatus connection port, for disconnecting the node apparatus connection port from the lattice communication network, when no phantom signal has been received from the terminal connection port, so that message information received from the second terminal via the terminal connection port is looped back from the node apparatus connection port and output from the terminal connection port, and said switching means connecting the node apparatus connection port to the lattice communication network, when a phantom signal has been received from the terminal connection port, so that a signal sent by the second terminal to the terminal connection port is transmitted to the lattice communication network via the node apparatus connection port.

12. The network interface unit as claimed in claim 11, wherein said switching means stops a signal, sent by the node apparatus of the lattice communication network to the node apparatus connection port, from being output to the terminal connection port via the node apparatus connection port when no phantom signal has been received from the terminal connection port.

13. The network interface unit as claimed in claim 11, wherein said switching means comprises a relay driver, coupled to the terminal connection port, for detecting whether or not a phantom signal has been received from the terminal connection port and driving a set of relays coupled to the node apparatus connection port, when the phantom signal has been received, so that the node apparatus connection port is selectively connected to the lattice communication network.

14. A communication system comprising:
a lattice communication network having a multi-conjunction architecture and comprising:
  a plurality of node apparatuses;
  a plurality of first terminals; and
  a plurality of transmission paths each coupling one node apparatus to another node apparatus or a first terminal,
  each node apparatus including an input port comprising a plurality of input channels connected to the transmission paths, an output port comprising a plurality of output channels connected to the transmission paths, a switching gate part for coupling the input and output channels of the input and output ports, and control means for controlling the switching gate part to selectively couple one of the input channels which receives a digital signal first to all the output channels other than one of the output channels having a channel number corresponding to a channel number of said one input channel according to a first-input-first-output logic,
at least one token ring network comprising:
  at least one second terminal which functions as one of transmitting and receiving second terminals; and
  a cable which is coupled to the second terminal and forms a ring, a carrier signal and a free token being recirculated around the ring of the cable even in a standby state,
  said transmitting second terminal catching the free token and transmitting message information which is added to a busy token,
  said receiving second terminal copying the message information which is received and returning the message information which is added with a copy code,
  said transmitting second terminal entering the message information which is returned from said receiving second terminal and outputting a free token when an establishment of a communication is confirmed from the copy code, and
  at least one network interface unit which couples said lattice communication network to one token ring network, said network interface unit comprising:
    a terminal connection port coupled to the second terminal of the token ring network via the cable;
    a node apparatus connection port coupled to the node apparatus of the lattice communication network;
    a free token generator, coupled to said terminal connection port and said node apparatus connection port, for intermittently generating a carrier signal and a free token and outputting the generated carrier signal and free token to said terminal connection port when no carrier signal has been received from said node apparatus connection port;
    a token detector, coupled to said terminal connection port, for detecting whether a free token or message information has been received from said terminal connection port, said token detector absorbing the free token when the free token is detected and outputting the message information and a carrier signal to said node apparatus connection port when the message information is detected so as to broadcast the message information within the lattice communication network;
    an address detector, coupled to said terminal connection port and said node apparatus connection port, for detecting, from the message information received from said terminal connection port, and storing a source address of the transmitting second terminal connected to the token ring network and detecting from the message information received from said node apparatus connection port whether or not a destination address matches the stored source address;
    reception register means, coupled to said node apparatus connection port and said terminal connection port, for stopping said free token generator from generating the free token when message information has been received from the lattice communication network via said node apparatus connection port and for outputting the message information received from the lattice communication network to said terminal connection port; and
    a sequence controller coupled to and controlling said free token generator, said address detector and said reception register means,
    said sequence controller controlling said token detector and said reception register means so that the message information received from said node apparatus connection port is looped back from the token ring network via said terminal connection port and output from said node apparatus connection port when said address detector detects that the destination address matches the stored source address, and the message information received from said node apparatus connection port is looped back from the token ring network via said terminal connection port and absorbed when said address detector detects that the destination address does not match the stored source address.

15. The communication system as claimed in claim 14, wherein said reception register means of said network interface unit outputs the message information received from the lattice communication network via said node apparatus connection port to said terminal connection port in synchronism with the carrier signal which is being output from said free token generator.

16. The communication system as claimed in claim 14, wherein the carrier signal is a signal "0" in a differential Manchester code.

17. The communication system as claimed in claim 14, wherein said token detector of said network interface unit includes a transmission register which distinguishes the free token from the message information by reading a token indicator of a signal which is received from said terminal connection port.

18. The communication system as claimed in claim 17, wherein said address detector of said network interface unit includes an address comparing register which compares the destination address of the message information received from said node apparatus connection port with the stored source address, and said token detector of said network interface unit further includes a down load register which reads the source address of the transmitting second terminal from the message information received from said terminal connection port and down loads the source address into said address comparing register.

19. The communication system as claimed in claim 17, wherein said transmission register of said network interface unit absorbs the message information which has been received from said node apparatus connection port and looped back from the token ring network via said terminal connection port when said address detector detects that the destination address does not match the stored source address.

20. The communication system as claimed in claim 14, wherein said reception register means of said network interface unit includes gate means for looping back the message information received from said node apparatus connection port via the token ring network and said terminal connection port to be output from said node apparatus connection port when said address detector detects that the destination address matches the stored source address, and absorbing the message information which is received from said node apparatus connection port and looped back from the token ring network via said terminal connection port when said address detector detects that the destination address does not match the stored source address.

21. The communication system as claimed in claim 14, wherein said token detector of said network interface unit detects a collision when said reception register means delays outputting message information which has been received from said node apparatus connection port to said terminal connection port and said token detector detects message information received from the transmitting second terminal via said terminal connection port, and said reception register means of said network interface unit absorbs the message information received from said node apparatus connection port and said token detector absorbs the message information received from said terminal connection port when said token detector detects the collision, thereby disconnecting the token ring network and the lattice communication network.

22. The communication system as claimed in claim 14, wherein said token detector of said network interface unit detects a collision when said token detector receives message information from said terminal connection port and said reception register means receives message information from said node apparatus connection port, and said token detector stops outputting the message information which has been received from said terminal connection port to said node apparatus connection port when said token detector detects the collision, thereby disconnecting the token ring network and the lattice communication network.

23. The communication system as claimed in claim 14, wherein a plurality of token ring networks are coupled to said lattice communication network via a plurality of network interface units.

24. The communication system as claimed in claim 23, wherein a single ring is formed within the communication system when making a first communication, said single ring including the lattice communication network, two token ring networks and two network interface units.

25. The communication system as claimed in claim 24, wherein at least one other ring is formed within the communication system when making a second communication simultaneously with said first communication, said other ring including one token ring network and one network interface unit which are other than those used for said first communication.

26. The communication system as claimed in claim 14, wherein said transmitting second terminal includes collision detection means for detecting a collision when the message information transmitted from said transmitting second terminal is not looped back from said lattice communication network via said network interface unit within a predetermined time, and means for retransmitting the message information when said collision detection means detects the collision.

27. The communication system as claimed in claim 14, wherein said transmitting second terminal includes collision detection means for detecting a collision when an end of the message information transmitted from said transmitting second terminal is not detected from the message information which is looped back from said lattice communication network via said network interface unit within a predetermined time, and means for transmitting a free token when said collision detection means detects the collision.

28. The communication system as claimed in claim 14, wherein said second terminal applies a phantom signal to the terminal connection port of the network interface unit and detects from a detection signal received from the terminal connection port whether or not the second terminal is connected normally to the network interface unit, said network interface unit comprising phantom signal means, coupled to the terminal connection port, for outputting said detection signal to said second terminal via the terminal connection port when the applied phantom signal has been received, said phantom signal means including a set of resistors, coupled to the terminal connection port, each of said resistors having a resistance that produces a level of said detection signal appropriate for the second terminal to detect the connection of the second terminal to the network interface unit.

29. The communication system as claimed in claim 28, wherein said phantom signal means comprises switching means, coupled to the terminal connection port and the node apparatus connection port, for disconnecting the node apparatus connection port from the lattice communication network, when no phantom signal has been received from the terminal connection port, so that message information received from the second terminal via the terminal connection port is looped back from the node apparatus connection port and output from the terminal connection port, and said switching means connecting the node apparatus connection port to the lattice communication network, when a phantom signal has been received from the terminal connection port, so that a signal sent by the second terminal to the terminal connection port is transmitted to the lattice communication network via the node apparatus connection port.

30. The communication system as claimed in claim 29, wherein said switching means stops a signal, sent by the node apparatus of the lattice communication network to the node apparatus connection port, from being output to the terminal connection port via the node apparatus connection port when no phantom signal has been received from the terminal connection port.

* * * * *